United States Patent [19]
Nakagaki et al.

[11] Patent Number: 5,227,928
[45] Date of Patent: Jul. 13, 1993

[54] MAGNETIC RECORDING/REPRODUCING APPARATUS WHICH MAINTAINS A CONSTANT SPEED RELATION BETWEEN A LINEARLY MOVING TAPE AND A ROTATIONALLY MOVING HEAD

[75] Inventors: Harushige Nakagaki; Masafumi Nakamura; Takaharu Noguchi, all of Kanagawa; Shouzaburo Sakaguchi; Kenichiro Kawasaki, both of Saitama, all of Japan

[73] Assignees: Pioneer Electronic Corporation; Hitachi Ltd., both of Tokyo, Japan

[21] Appl. No.: 758,479

[22] Filed: Sep. 9, 1991

Related U.S. Application Data

[63] Continuation of Ser. No. 362,557, Jun. 6, 1989, abandoned.

[30] Foreign Application Priority Data

Jun. 6, 1988 [JP] Japan ................... 63-137577
Jun. 6, 1988 [JP] Japan ................... 63-137580

[51] Int. Cl.⁵ ........................................ G11B 15/46
[52] U.S. Cl. ........................ 360/73.08; 360/77.12; 360/70; 360/72.3
[58] Field of Search ............... 360/70, 71, 72.3, 73.01, 360/73.04, 73.05, 73.07, 73.08, 73.06, 10.3, 77.12

[56] References Cited

U.S. PATENT DOCUMENTS

| | | | |
|---|---|---|---|
| 3,913,134 | 10/1975 | Sargunar | 360/73.08 X |
| 4,630,142 | 12/1986 | Tani et al. | 360/70 |
| 5,021,896 | 6/1991 | Horino | 360/70 |
| 5,053,895 | 10/1991 | Choi | 360/70 |

FOREIGN PATENT DOCUMENTS 61-110359 5/1986 Japan.
61-214164 9/1986 Japan.

Primary Examiner—Andrew L. Sniezak
Attorney, Agent, or Firm—Sughrue, Mion, Zinn, Macpeak & Seas

[57] ABSTRACT

A magnetic recording/reproducing apparatus for recording a signal onto a magnetic tape and reproducing a recorded signal comprises magnetic heads mounted on a rotary cylinder, a tape driving mechanism, high speed running control device for driving a reel shaft to rotate at a speed higher than a normal recording/reproducing speed, tape-running detecting device, reel motor starting device for generating a ramp voltage having a suitable gradient, a switch for turning on/off the tape running speed control by the high speed running control device and adding device. In the apparatus the cylinder rotation speed follow-up control never comes out in making the high speed running of the tape rise, so that the relative speed between the head and tape is maintained to substantial constant.

9 Claims, 14 Drawing Sheets

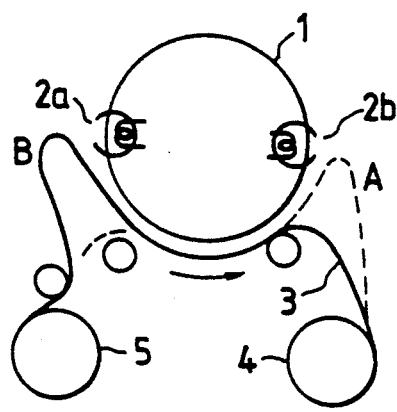
FIG. 5A
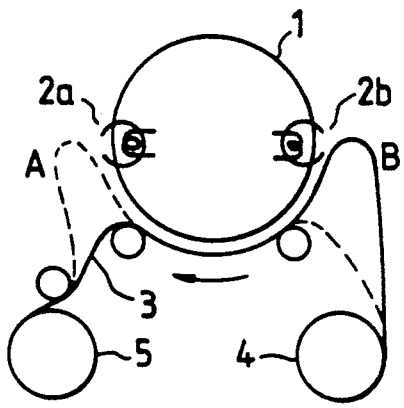
FIG. 5B
FIG. 6
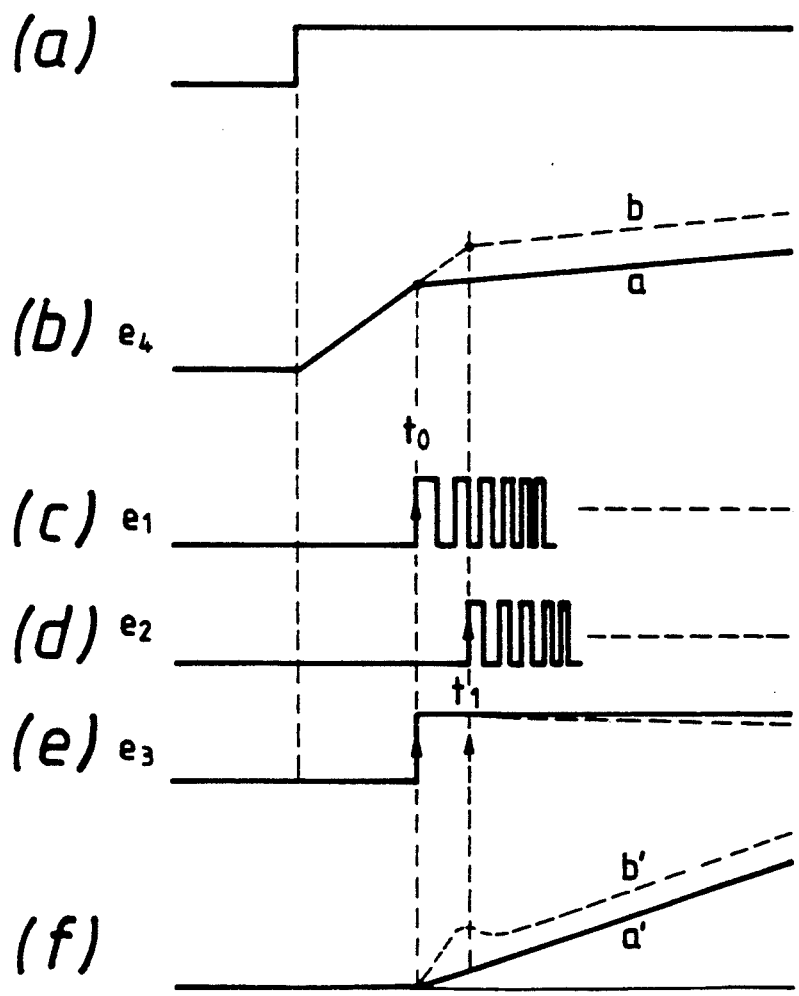

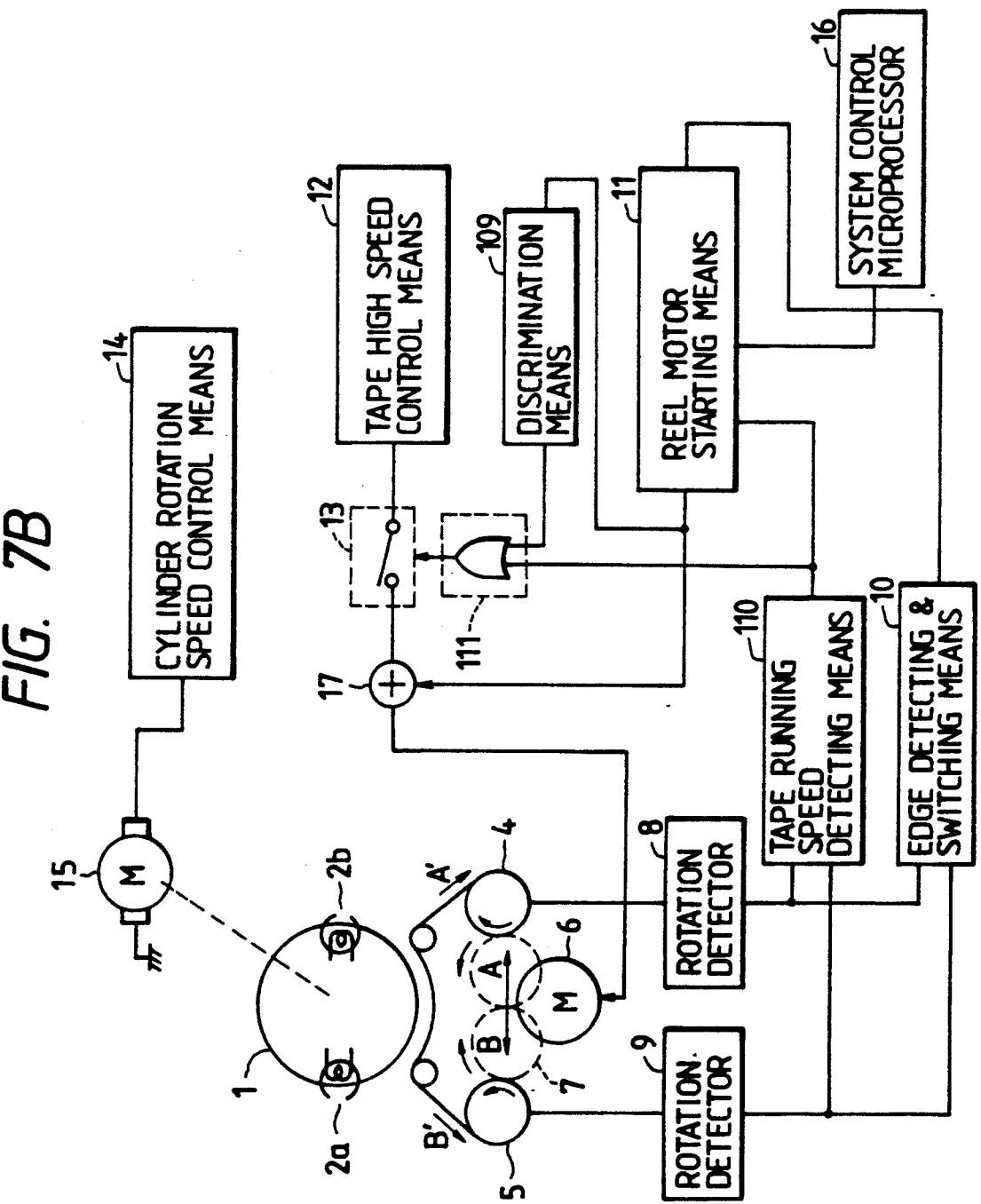

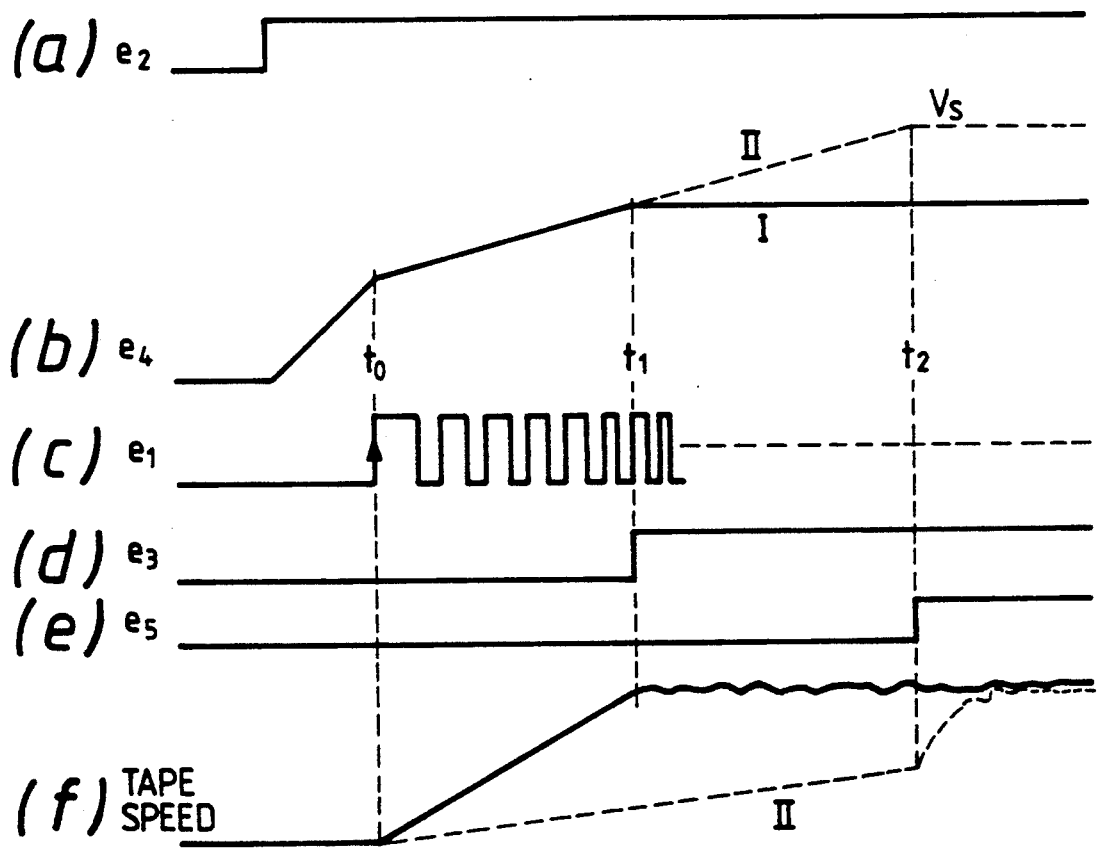

MAGNETIC RECORDING/REPRODUCING APPARATUS WHICH MAINTAINS A CONSTANT SPEED RELATION BETWEEN A LINEARLY MOVING TAPE AND A ROTATIONALLY MOVING HEAD

This is a continuation of application Ser. No. 07/362,557 filed June 6, 1989, abandoned.

BACKGROUND OF THE INVENTION

The present invention generally relates to a magnetic recording/reproducing apparatus, and particularly relates to a digital audio tape recorder (hereinafter referred to as "DAT") of the rotary head type.

In a DAT of the rotary head type, in order to perform high-speed random selection of tunes (review of tunes) at a speed of ten times or hundred times as high as a normal reproducing speed, it is necessary to correctly read a signal indicating start of a tune, a signal for performing time indication, a signal representing tune number, etc., which are recorded on a track with the same recording density as a music PCM signal.

If a tape is made to run at a high speed which is different from the speed in normal recording/reproducing, the scanning locus of a head intersects a signal track on the tape a plurality of times so that the relative speed of the head and tape varies under the condition in which the rotating speed of a cylinder is constant.

In a DAT, on the other hand, a data strobe circuit is employed as a circuit for reproducing a digital signal from a signal reproduced by a head. In this circuit, the input transmission rate has a margin of about ±10% against speed deviations and jitters in the tape running system, and the speed of the tape relative to the head varies in high speed rotation of the tape, so that if the input signal transmission rate comes out the range of the margin of about ±10%, there occurs such a disadvantage that the data reproduction becomes impossible, that is, random access becomes impossible.

In a DAT, accordingly, it is impossible to make the cylinder rotation speed high speed rotation of the tape the same as that in normal recording/reproducing operation, and it is indispensably necessary to perform follow-up control in accordance with the tape running speed so as to maintain the relative speed between the head and tape constant or to maintain the jitter in the data strobe circuit within an allowable range. As a control apparatus to make the cylinder rotation speed vary in accordance with the tape running speed so as to control the relative speed between the head and tape to be constant, there are those disclosed, for example, in Japanese Patent Unexamined Publication Nos. 61-214164 and 61-110359. In those control apparatuses, the cylinder rotation speed is controlled so that the reproduction clock frequency obtained as a frequency synchronized with a reproduction signal in a data strobe circuit is set at a predeterminedly fixed frequency.

In a recording/reproducing apparatus, such as a digital audio tape recorder, for recording/reproducing information by a rotary drum, it is necessary to control the rotation of each of a capstan shaft, a reel and the rotary drum.

In the past, circuits as shown in FIGS. 13 and 14 have been employed as circuits for controlling the rotation of the capstan shaft and the reel. In the following, the circuits are described.

FIG. 13 shows a capstan servo circuit, in which the reference numeral 1 designates an FG frequency divider for dividing the frequency of an output signal obtained from an FG of a capstan motor. The FG frequency divider has a frequency division step capable of obtaining a suitable tape speed by changing the frequency-division rate of the signal when the capstan shaft is rotated in a variable speed mode, and capable of being through in the normal recording/reproducing period. The reference numeral 2 designates a capstan speed comparator for counting the period of the FG signal from the FG frequency divider 1 by clock pulses $CK_1$ to thereby detect the deviation between the FG signal period and a reference period as a digital speed error. The reference numeral 3 designates a pulse-width modulator for pulse-width-modulating the digital speed error obtained by the capstan speed comparator 2. The reference numeral 4 designates a low-pass filter for selecting low-band pulses from the pulse signal given by the pulse-width modulator 3 to pass the low-band pulses. Thus, an analog error voltage is generated from the low-pass filter. The aforementioned parts constitute a capstan servo speed control system.

The reference numeral 5 designates a PG frequency divider for dividing the frequency of the FG frequency-divider output obtained by the FG frequency divider 1 so as to make the frequency equal to the frequency of a phase reference signal. The reference numeral 6 designates a capstan phase comparator for counting, on the basis of clock pulses $CK_2$, the phase deviation between the PG frequency divider output obtained by the PG frequency divider 5 and a phase reference signal to thereby detect the phase deviation as a digital phase deviation. The reference numeral 7 designates a pulse-width modulator for pulse-width-modulating the digital phase error obtained by the capstan phase comparator 6. The reference numeral 8 designates a low-pass filter which is arranged to allow only low-band pulses of the pulse signal given by the pulse-width modulator 7 to pass therethrough as an analog error voltage. The aforementioned parts constitute a capstan servo phase control system.

The reference numeral 9 designates an adder for adding the speed error voltage and the phase error voltage of the capstan motor at a suitable gain rate.

The operation of the circuit will be described with reference to the aforementioned construction of the circuit. The FG signal from the capstan motor is frequency-divided by the FG frequency divider 1. Then, the resultant signal is outputted as a digital speed error from the capstan speed comparator 2. The output from the capstan speed comparator 2 is converted into an analog error voltage through the pulse-with modulator 3 and the low-pass filter 4, and the analog error voltage is in turn applied to the adder 9.

On the other hand, the signal frequency-divided by the FG frequency divider 1 is further frequency-divided by the PG frequency divider 5 so as to be made equal to the frequency of a phase reference signal, and then, the resultant signal is outputted as a digital phase error from the capstan phase comparator 6. The output from the capstan phase comparator 6 is applied to the adder 9 as an analog error voltage through the pulse-width modulator 7 and the low-pass filter 8.

Accordingly, the adder 9 operates to add the speed error voltage and the phase error voltage of the capstan motor to each other at a suitable gain rate and supply the resultant voltage to a capstan motor driver circuit (not shown) to thereby control the capstan shaft to keep its rotation speed constant.

FIG. 14 is a circuit diagram in the case where tape speed is required to be kept substantially constant as in the search time in a digital audio tape recorder. In the circuit, a servo is applied to a reel motor to keep the sum of the respective periods of a take-up reel FG signal and a feed reel FG signal constant. The reference numerals 10 and 11 designate edge detectors for detecting leading and trailing edges of the FG signals from take-up and feed reels, respectively. The reference numeral 12 designates a switching circuit for switching the respective edge-detection signals to count, by a next-stage counter, one period of the take-up reel FG signal and one period of the feed reel FG on the basis of the edge-detection signals obtained by the edge detectors 10 and 11, alternatively. The reference numeral 13 designates a reel speed comparator which counts the one period of the take-up reel FG signal on the basis of clock pulse $CK_3$ and then counts the one period of the feed reel FG signal on the basis of the clock pulses $CK_3$ following the counting of the take-up reel FG signal. The reference numeral 14 designates a pulse-width modulator for pulse-width-modulating a digital speed error given by the reel speed comparator 13. The reference numeral 15 designates a low-pass filter which operates to allow low-band pulses of the pulse signal given from the pulse-width modulator 14 to pass therethrough so as to output them as an analog error voltage. In short, upon completion of counting one period of the take-up reel FG signal and one period of the feed reel FG signal by the counter of the reel speed comparator 13, the count value at this point in time becomes an error voltage representing a digital speed error The operation of the circuit will be described with reference to the aforementioned construction of the circuit. As shown in FIG. 15, when the measurement of the sum of periods is started, the switching circuit 12 outputs a high-level signal, for example, during one period of the take-up reel FG signal, that is, during one period in which two edge pulses are output. Then, when an edge pulse of the feed reel FG signal is supplied to the switching circuit, the switching circuit outputs a high-level signal again during one period of the feed reel FG signal. The output signal from the switching circuit 12 is applied to a counting terminal of the counter of the reel speed comparator 13, so that clock pulses are counted while the terminal is in a high level. When the one period of the take-up reel FG signal and the one period of the feed reel FG signal have been measured by the counter, the count value of the counter is latched and then converted into a pulse signal which is in turn output as an analog error voltage through the low-pass filter 14. The analog error voltage is supplied to a reel motor driver (not shown).

Once latched, the count data of the reel speed comparator 13 is cleared or reset so as to perform the next period sum measurement mode.

In the afore-mentioned high speed access control, it is impossible to rapidly increase the tape speed, that is the rotation speed of a reel motor for driving a reel mount, simultaneously with the start of access. This is because, if the tape speed is increased rapidly the aforementioned cylinder follow-up servo may unlock because of delay in rotation speed follow-up due to the inertia of the cylinder. Accordingly, it is necessary to gradually or gently increase the speed of the tape, that is, the gradually increase the rotation speed of the reel motor, to achieve a high rotation speed.

In the foregoing prior art, the gradual increase in the high speed rotation tape is not taken into consideration, and therefore has had a problem when rapidly increasing the speed of rotation of the reel motor, since this rapid increase causes, the follow-up control of the cylinder rotation speed to very such that the relative speed between the head and tape deviates to such a degree that data reproduction is impossible.

In the aforementioned servo circuit, it is necessary to control the capstan motor and the reel motor by servo circuits provided separately. Accordingly, there arises a problem in that the circuit is complicated in construction, which increases the cost and space.

SUMMARY OF THE INVENTION

It is a first object of the present invention to provide a reel motor starting apparatus which maintains a known relation between the cylinder rotation speed and the tape rotation speed when increasing the tape speed for high speed rotation even when there is slack in the tape.

In achieving the above object, in order to maintain control of the cylinder rotation speed while increasing the tape rotation speed, suffice it to raise the rotation speed of the reel motor gradually. This can be achieved by raising the voltage applied to the reel motor along a gentle ramp under the opened condition of the reel motor servo. If a gentle ramp voltage is applied to the reel motor while increasing the reel motor speed, there occurs a disadvantageous loss time before the reel motor starts t actually rotate because the motor has a dead zone. In the apparatus according to the present invention, therefore, a ramp voltage having a steep gradient is applied to the reel motor before the reel motor starts to actually rotate to thereby shorten the loss time. The ramp voltage applied to the reel motor is switched to another ramp voltage having a gentler gradient after the reel motor has started its actual rotation.

The prevention of steep rises in the reel motor speed due to slack of the tape can be achieved by the arrangement in which the timing of the start of running of the tape is detected by detecting the start of reel-mount rotation always at the tape take-up side in accordance with the direction of tape running. The voltage to be applied to the reel motor is switched from the ramp voltage having the steep gradient to the ramp voltage having the gentle gradient in response to the detected timing signal.

A reel-mount rotation detection means provided at the magnetic tape take-up side and the magnetic tape feed side produces a rotation signal synchronized with the rotation of each reel mount. An edge detection means is controlled, for example, by a system control microprocessor or the like which monitors the output of the reel-mount rotation detection means, located at the tape take-up side, in accordance with the forward or reverse tape running mode to thereby generate a control signal at a time coincident with the initiation of rotation of the reel mount.

A reel motor starting means generates the ramp voltage having a steep gradient simultaneously with the search initiation to thereby start the rotation of the reel motor. The starting means also generates the other ramp voltage having a gentle gradient, after reception of the control signal from an edge detection means.

In such a configuration, after each reel mount, hence, the tape has started to move, the tape speed is increased gradually and gently by the gentle gradient ramp voltage applied from the reel motor starting means so that the lock of the cylinder rotation speed follow-up servo never comes out. Further, since the switching of the ramp voltage is performed in response to the detection of the initiation of rotation of the reel mount always at the tape take-up side in accordance with the direction of search, the tape speed never increases to steeply even in the case where the tape has slack.

It is a second object of the present invention to provide a reel motor starting apparatus in which the cylinder rotation speed follow-up control never comes out when increasing the tapes high speed. After the tape speed has reached a predetermined value, the tape speed raising control is smoothly switched, in response to the detection of the above fact, into the primary control by a tape high-speed running control means for keeping the tape speed constant, while the control operation by the tape high-speed running control means can be started even in the case where the tape running speed does not reach the predetermined value because the load in tape take-up is so large that the control range of circuit comes out.

In order to achieve the second object, the apparatus is configured so that a ramp voltage having a steep gradient is applied to the reel motor to shorten the loss time before the reel motor has started to actually rotate and the ramp voltage is switched to another ramp voltage having a gentle gradient after the reel motor has started to actually rotate.

In order to achieve the switching, the reel motor is controlled by use of the ramp voltage of a gentle gradient into the control by the tape high-speed running control means for keeping the tape running speed constant, the tape running speed is monitored to detect the fact that the value of the tape running speed has reached the control center of the tape high-speed running control means and the switching control is performed in response to the detection of the fact.

In order to eliminate the disadvantage that the tape speed does not reach a predetermined value even if the ramp voltage has reached its maximum control value. For example, the value of the ramp voltage is monitored, so that the reel motor control by use of the ramp voltage is forcibly switched into the control by the tape high-speed running control means for keeping the tape speed constant upon detection of abnormality in the value of the ramp voltage.

A reel-mount rotation detection means generates a rotation signal in sync with the rotation of the reel mount. A reel motor starting means generates, first, the ramp voltage having a steep gradient at the same time with a command of search initiation of thereby start the rotation of the reel motor. The starting means thereafter generated the ramp voltage having a gentle gradient when an edge of the control signal from the reel-mount rotation detection means is detected after the reel mount moves. It then receives a control signal from a tape running speed detection means when the rotation speed of the reel motor has been raised by the ramp voltage to a predetermined value, the value of the ramp voltage at that time being held. The tape running speed detection means monitors and running speed of the tape and outputs the control signal upon detection of the fact that the tape speed has reached a target control value of the tape high-speed running control means. A discrimination means discriminates the value of the ramp voltage produced from the reel-motor starting means and produces a predetermined control signal upon detection of the fact that the value of the ramp voltage has reached the maximum value in the control range.

A control means receives the respective control signals from the tape running speed detection means and the discrimination means so that the control means produces a signal for controlling the switching means to close the control loop by the tape high-speed running control means. An adder adds the control signal applied from the reel motor starting means and the control signal applied from the tape high-speed running control means through a switching means, the output of the adder being supplied to the reel motor.

In such a configuration, after each reel mount, hence, the tape has started to move, the tape speed is raised gradually gently in accordance with the rotation of the reel motor by the gentle gradient ramp voltage from the reel motor starting means, so that the lock of the cylinder rotation speed follow-up servo can be prevented from coming out. Further, since the switching of the ramp voltage is performed in response to the detection of the initiation of rotation of the reel mount always at the tape take-up side in accordance with the direction of search, the tape speed never rises to steeply even in the cases where the tape has slack.

Further, if the tape running speed has been raised by the ramp voltage of the reel motor starting means to reach the target control value of the tape high-speed running control means, the control means is actuated by the control signal from the tape running speed detection means. This actuation closes the control loop for the tape high-speed running control means such that the tape speed is controlled to remain constant thereafter. Furthermore, in the case where the tape running speed does not reach the target control value of the high-speed running control means because of a large load on tape take-up, the control loop by the tape high-speed running control is closed by the control signal from the discrimination means. Accordingly, the tape is prevented from continuously running at a low speed for a long time, so that the tape speed control can be rapidly shifted to the fixed-speed control.

It is a third object of the present invention to provide a servo circuit in a recording/reproducing apparatus in which a servo circuit can be used commonly by a capstan motor system and a reel motor system to make it possible to simplify the circuit configuration to thereby reduce the manufacturing cost and the circuit size.

To attain the foregoing third object, the gist of the present invention is in that a phase servo circuit of a capstan servo is used for generating a ramp voltage at the time for starting the reel rotation and in that the servo center crossing of a speed error voltage in a reel servo is detected to thereby hold the ramp voltage and, at the same time, output a reel servo speed error.

BRIEF DESCRIPTION OF THE DRAWINGS

Other features and advantages of the present invention will be apparent from the following description taken in connection with the accompanying drawings, wherein:

FIGS. 5a and 5b are a typical diagrams showing the state of slack of the tape in searching operations;

FIG. 6 is a waveform diagram showing the operation of the first embodiment of the present invention;

FIGS. 7a and 7b are block diagrams illustrating a second embodiment of the magnetic recording/reproducing apparatus according to the present invention;

FIG. 12 is a diagram showing the operation of the second embodiment of the present invention;

DETAILED DESCRIPTION OF THE PREFERRED EMBODIMENTS

Now, referring to the accompanying drawings, specific embodiments of the present invention will be described hereunder.

Figure 1:
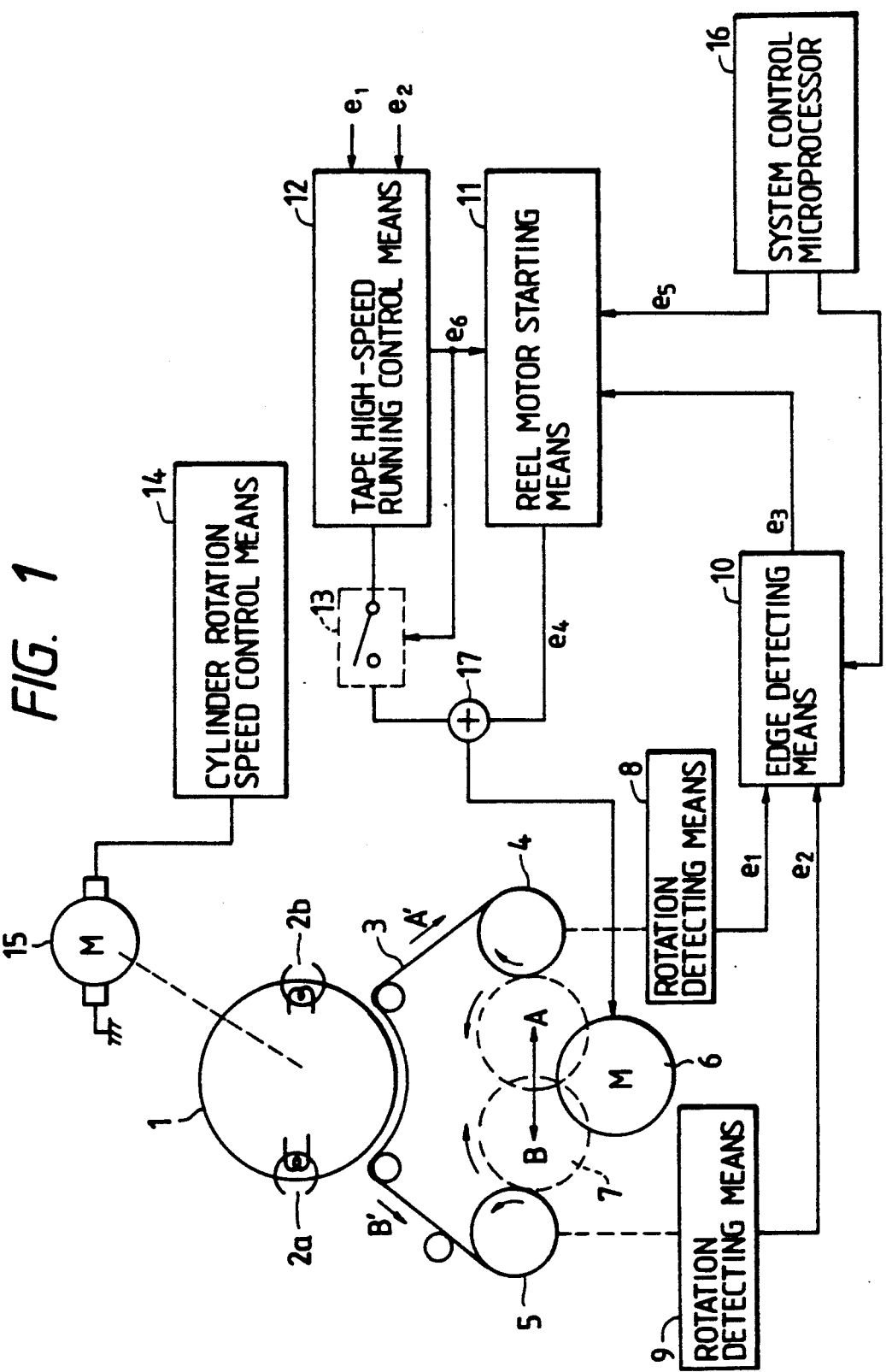
FIG. 1 is a block diagram illustrating a first embodiment of the magnetic recording/reproducing apparatus according to the present invention.

FIG. 1 shows, a first embodiment of the present invention. In the FIG. 1, the apparatus according to the present invention is constituted by a cylinder 1, magnetic heads 2a and 2b, reel mounts 4 and 5 for taking-up and feeding-out a magnetic tape 3 respectively, a reel motor 6, gears 7 interlinked with the reel motor 6 for driving the reel mounts 4 and 5 in accordance with the rotation of the reel motor 6, reel mount detection means 8 and 9 for detecting the rotation of the reel mounts 4 and 5 respectively, an edge detection means 10, a reel motor starting means 11, a tape high-speed running control means 12 for controlling the rotation speed of the reel motor 6 so as to control the running speed of the tape 3 to be a predetermined value in a high-speed running mode, a switching means 13, a cylinder rotation speed control means 14 for controlling the rotation speed of the cylinder 1, a cylinder motor 15 for driving the cylinder 1, a system control microprocessor 16 for controlling the whole system, and an adder 17.

In such a configuration of the embodiment of FIG. 1, at the initiation of a search, the switching means 13 is opened to open a servo loop and a ramp voltage having a steep gradient is produced from the reel motor starting means 11 so as to start the driving of the reel motor 6. Next, the movement of the reel mount is detected by the edge detection means 10, and a ramp voltage having a gentle gradient is produced from the reel motor starting means 11 in response to the control signal of the edge detection means 10 so as to gradually and gently increase the running speed of the tape 3. Moreover, the tape running initiation timing is detected by judging the movement of the reel mount always at the tape take-up side. That is, the edge detection means 10 switches the ramp voltage by judging the edge of the output of the reel mount rotation detection means 8 in the case of the forward search where the gears 7 move to the side A so as to make the tape 3 run in the direction of an arrow A' in the drawing, while by judging the edge of the output of the reel mount rotation detection means 9 in the case of the reverse search where the gears 7 move to the side B so as to make the tape 3 run in the direction of an arrow B' in the drawing.

The cylinder rotation speed control means 14, specifically, is constituted by an apparatus disclosed, for example, in Japanese Patent Unexamined Publication No. 61-110359. Further, the tape high-speed running control means 12 is constituted, for example, by a well known servo loop arranged so as to maintain a constant sum the of frequencies of FG signals synchronized with the respective rotation speeds of the reel mounts 4 and 5. Detailed description of those means 12 and 14 is omitted here, because the configurations and controlling operations of those means 12 and 14 are well known, and do not directly relate to the essence of the present invention.

The reel motor starting control which is one of the constituent features of the present invention will be described hereunder. First, the operations of various portions for the reel motor starting control will be described.

Figure 2:
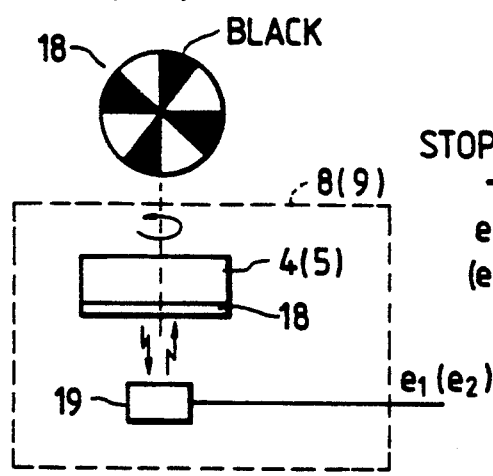
FIGS. 2a and 2b are typical diagrams illustrating a specific example of the configuration of the reel-mount rotation detection means and showing the operation thereof.
Figure 2:
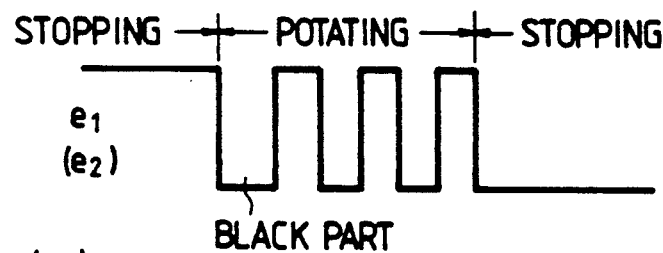

FIG. 2 shows the configuration and operation waveform of the reel mount rotation detection means 8 and 9. In FIG. 2, the reference numeral 18 designates aluminum foil or the like attached on the reel mounts 4 and 5 integrally therewith, the aluminum foil of the like having a surface equidistantly colored in black at its periphery as shown in FIG. 2(a). The reference numeral 19 designates a photodetector. Each of the reel mount rotation detection means 8 and 9 is arranged so that the aluminum foil 18 is irradiated with light emitted from a light emission element of the photodetector 19, and the light reflected from the aluminum foil 18 is received by a light reception element of the photodetector 19. The quantity of the reflected light is at a maximum at the non-black portion to thereby make the output of the light reception element maximum while the reflected light is at a minimum at the black portion to thereby make the output of the light reception element a minimum. Therefore, the output $e_1$ (or $e_2$) of the light reception element of the photodetector 19 alternately changes between the levels "H" and "L" in synchronism with the rotation of the aluminum foil 18 while the reel mount 4 (or 5) is rotating, while the output of the light reception element of the photodetector 19 takes a fixed voltage having the level "L" or "H" depending on the positional relation between the aluminum foil 18 and the photodetector 19 when each of the reel mount 4 (or 5) is in a stopped state as shown in FIG. 2(b).

Figure 3:
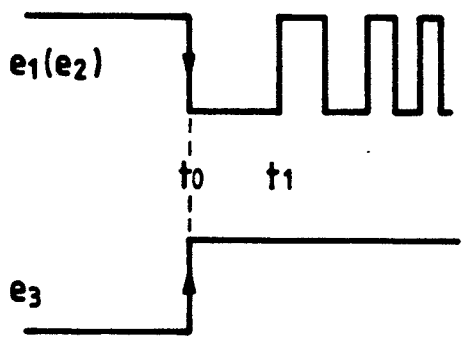
FIGS. 3a and 3b are diagrams showing the operation of edge detection means.
Figure 3:
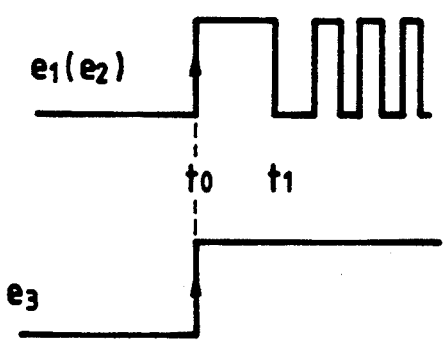

FIG. 3 shows the operation waveforms of the edge detection means 10. When the reel mount 4 (or 5) is started to rotate as shown in FIG. 2, the level of the output $e_1$ (or $e_2$) of the reel mount rotation detection means 8 (or 9) is inverted from "H" into "L" as shown in FIG. 3(a) or form "L" into "H" as shown in FIG. 3(b) at a point of time $t_0$ where the reel mount 4 (or 5) is started to move. Thereafter, the level of the output $e_1$ (or $e_2$) charges alternately in synchronism with the rotation of the reel mount 4 (or 5). The edge detection means 10 detects a point of change of the level of the output $e_1$ (or $e_2$) of the reel mount rotation detection means 8 (or 9) at the time $t_0$ in FIGS. 3(a) and 3(b), and produces a reel mount rotation detected signal which changes from "L" into "H" at the time $t_0$ as shown by $e_3$ in FIG. 3. Judgement of the output of the reel mount rotation detection means by the edge detection means 10 is controlled by the system control microprocessor 16 so that the reel mount rotation detection means at the tape take-up side is always selected in accordance with the direction of search. That is, in FIG. 1 the output $e_1$ of the reel mount rotation detection means 8 is selected in the case of the forward search, and alternatively, the output $e_2$ of the reel mount rotation detection means 9 is selected in the case of the reverse search. Thus, the edge detected signal $e_3$ is produced on the basis of the output $e_1$ or $e_2$.

Although the description has been made so that the first point where the output of the reel mount rotation detection means changes is detected at the time $t_0$ in the example of FIG. 3, the present invention is not particularly limited to this. Taking into consideration an abnormal operation due to noises or the like, the second point of change at the time $t_1$ in the FIGS. 3(a) and 3(b) may be detected. Since the operation of the edge detection means 10 is well known, detailed description thereof is omitted.

Figure 4A:
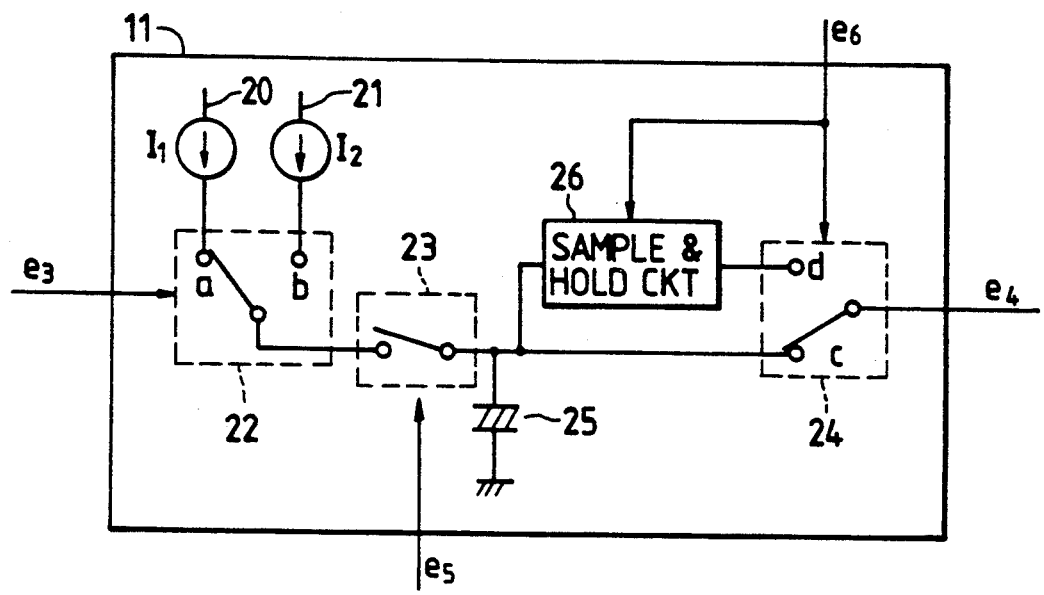
FIGS. 4a and 4b are diagrams illustrating a specific example of the configuration of the reel motor starting means and showing the operation waveforms thereof.
Figure 4B:
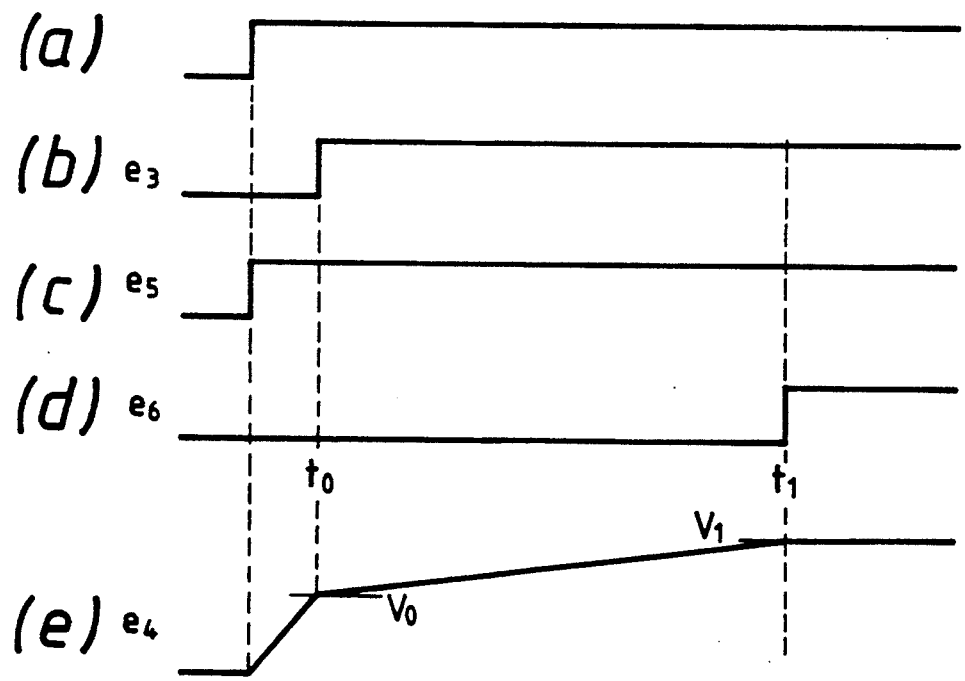

FIGS. 4A and 4B show a specific example of the reel motor starting means 11 and the operation waveforms thereof. In the drawing, the reel motor starting means 11 is constituted by constant-current regulated power supplies 20 and 21, switches 22 through 24, a capacitor 25, and a sample and hold circuit 26. In FIG. 4A, the parts the same as those in FIG. 1 are referenced correspondingly.

The switch 22 is controlled on the bases of the control signal $e_3$ of the edge detection means 10 to operate so that the contact thereof is closed to the side when the signal $e_3$ is in "L" while the contact is closed to the b side when the signal $e_3$ becomes "H". The switch 23 is controlled on the bases of the control signal $e_5$ of the system control microprocessor 16 so as to be closed when the control signal $e_5$ is in "H". The sample and hold circuit 26 is operated on the bases of a control signal $e_6$ produced from the tape high-speed running control means 12 when the tape running speed has reached a predetermined value after starting of the reel motor so that the sample and hold circuit 26 holds the voltage of the capacitor 25 as a pre-value. The switch 24 is controlled also on the bases of control signal $e_6$ so that the contact thereof is closed to the c side at the starting of the reel motor while closed to the d side simultaneously when the control signal $e_6$ is generated to thereby operate the sample and hold circuit 26. The DC constant-current regulated power supplies 20 and 21 are provided for performing a constant-current charge of the capacitor 25. The Current values $I_1$ and $I_2$ of the DC constant-current regulated power supplies 20 and 21 are set so that $I_1 > I_2$.

In this configuration, if a key operation for instructing the initiation of search is executed as shown by an operation waveform (a) in FIG. 4B, the control signal $e_5$ of waveform (c) in FIG. 4B is produced from the system control microprocessor 16 to thereby close the switch 23. The reel motor is in a stopped state at the first place, and therefore the control output signal $e_3$ of the edge detection means 10 is in "L" as shown by the waveform (b) in FIG. 4B, so that the contact of the switch 22 is closed to the a side. Consequently, the constant current $I_1$ flows from the constant-current regulated power supply 20 into the capacitor 25 through the switches 22 and 23 so as to start the charging of the capacitor 25. The output $e_4$ of the reel motor starting means 11 takes a value as shown by the waveform (e) in FIG. 4B in accordance with the charge of the capacitor 25 because the contact of the switch 24 is being closed to the c side before the tape running speed has reached a predetermined value. The voltage is ramp-like so as to linearly increase as time elapses because that the capacitor 25 is charged with a constant current. The output $e_4$ is applied to the reel motor through the adder 17 as shown in FIG. 1. If the voltage $V_0$ at the time $t_0$ exceeds a starting dead zone of the reel motor, the reel motor starts to actually rotate to thereby move the reel mount. At this point of time, the control output signal $e_3$ of the edge detection means 10 is inverted from "L" into "H" by the foregoing operation to change over the contact of the switch 22 from the a side to the b side so that the current for charging the capacitor 25 is switched from $I_1$ to $I_2$. Since $I_2 < I_1$, the terminal voltage of the capacitor 25, that is, the output $e_4$, increases along a gentle gradient from the initiation voltage $V_0$ after the time $t_0$ in comparison with the steep gradient from the initiation of the search to the time $t_0$ as shown in the waveform (e) in FIG. 4B. After the time $t_0$, the rotation speed of the reel motor, hence the tape running speed, rises gradually and gently in accordance with the ramp voltage $e_4$ having a gentle gradient. At a point of time $t_1$ where the tape running speed reaches a predetermined value, however, the sample and hold circuit 26 is operated by the control signal $e_6$ of the tape high-speed running control means 12 so as to hold the voltage of the capacitor 25 as a pre-value. At the same time, the contact of the switch 24 is changed over from the c side to the d side, so that the voltage $e_4$ is held as the terminal voltage $V_1$ of the capacitor 25 at the time $t_1$ as shown by the waveform (e) in FIG. 4B.

After the time $t_1$, the switch 13 of FIG. 1 is closed, and predetermined tape running speed servo operation is performed by the tape high-speed running control means 12 on the basis of the held value $V_1$ of the voltage $e_4$.

Further, although illustration is made so that the voltage $e_4$ is directly applied to the reel motor in Figs. 1 and 4, a suitable drive amplifier or the like may be specifically interposed between the reel motor and the tape high-speed running control means 12. The description about this point is however omitted.

Description has been made a to the operations of the various portions for performing the reel motor starting control with reference to FIGS. 2 through 4. As seen from the operation waveforms of FIG. 4, first, the ramp voltage $e_4$ having a steep gradient is produced from the reel motor starting means 11 simultaneously with the initiation of search so as to drive the reel motor with this ramp voltage $e_4$. When the reel motor starts to actually rotate, the ramp voltage $e_4$ is switched to a ramp voltage having a gentle gradient in response to the detection of the start of rotation of the reel motor. As a result, the tape running speed rises gradually and gently from the ramp voltage switching point in accordance with the ramp voltage having a gentle gradient. Moreover, the ramp voltage having a gentle gradient is not applied to the reel motor from the initiation of search but the ramp voltage having a steep gradient is applied to the reel motor from the initiation of search to the start of driving of the reel motor. Therefore, the time taken from the initiation of search to the start of driving of the reel motor can be shortened to thereby make it possible reduce the time loss in search.

Next, description will be made as to the point where reel mount rotation initiation detection is performed always at the tape take up side in accordance with the search direction, which is another one of the constituent features of the present invention.

FIG. 5A shows a state of the forward search where the reel mount 4 is driven so as to make the tape run in the forward direction, and, on the contrary, FIG. 5B shows a state of the reverse search where the reel mount 5 is driven so as to make the tape run in the reverse direction. In the case of the forward search, assume that the tape has slack at the initiation of the search as shown by the broken line A or the solid line B. At this time, if the initiation of the reel mount rotation is detected on the basis of the movement of the reel mount 5 at the tape feed-out side, the timing of detection of the mount rotation is delayed to a point of time where the slack of the tape has been absorbed after the initiation of driving the reel mount 4 so that the reel mount 5 at the tape feed-out side starts to actually move, because the reel mount 4 disposed at the tape take-up side is driven by the reel motor. That is, if the reel mount rotation is detected on the basis of the movement of the reel mount 5 at the tape feed-out side, although the reel mount 4 is started to move in response to the foregoing ramp voltage produced from the reel motor starting means 11 and having a steep gradient, the control timing for switching to the ramp voltage having a gentle gradient is delayed correspondingly to the quantity of the slack of the tape. Similarly to this, in the case of the reverse search, if the initiation of reel mount rotation is detected on the basis of the movement of the reel mount 4 at the tape feed-out side, the same phenomenon as described above is generated.

If the reel mount rotation is detected on the basis of the movement of the reel mount always at the tape take-up side in accordance with the search direction, that is, the reel mount rotation is detected on the basis of the movement of the reel mount 4 in the case of the forward search while the basis of the movement of the reel mount 5 in the case of the reverse search, the foregoing problem can be solved.

FIG. 6 shows the operation in the case of the forward search (which is the same as in the case of the reverse search). If the tape has slack, the output $e_1$ of the reel mount rotation detection means 8 for the reel mount 4 at the tape take-up side and the output $e_2$ of the reel mount rotation detection means 9 for the reel mount 5 at the tape feed-out side appear as shown by the waveforms (c) and (d) in FIG. 6 respectively, so that the reel mount rotation detection timing becomes different between the reel mount rotation detection means 8 and 9. If the reel mount rotation is detected on the basis of the output $e_2$ at the tape feed-out side, the control output signal $e_3$ of the edge detection means 10 is produced at the time $t_1$ shown by the broken line in the waveform (e) in FIG. 6. If the reel mount rotation is detected on the basis of the output $e_1$ at the tape take-up side, on the contrary, the control output signal $e_3$ is synchronized with the edge of the output $e_1$ as shown by the solid line in the waveform (e) in FIG. 6 so as to quicken the timing to the time $t_0$. If the reel mount rotation detection timing is delayed to the time $t_1$, it is a matter of course that the switching of the ramp voltage $e_4$ of the reel motor starting means 11 is delayed as shown by the broken line in the waveform (b) in FIG. 6 so that a high voltage is applied to the reel motor because the first ramp voltage has a steep gradient so as to raise the tape running speed rapidly as shown by the broken line in the waveform (f) in FIG. 6. The tape running initiation timing, however, can be accurately detected by performing the reel mount rotation detection always at the tape take-out side, and even in the case where the tape has slack, the tape running can be raised gently as shown by the solid line in the waveform (f) in FIG. 6.

Although description has been made as to the case where two constant-current regulated power supplies are provided in the reel motor starting means 11 of FIG. 4A and the connection of the constant-current regulated power supplies is changed over to thereby switch the gradient of the ramp voltage in the first embodiment of the present invention, the present invention is not particularly limited to this, but the invention is applicable to the case where one constant-current regulated power supply is used and a connection selecting one of a high speed and a normal speed rotating operation to be preformed, said apparatus different capacities. Further, although the system is constituted by analog circuits in the first embodiment, the system may be constituted by digital circuits. Moreover, although the edge detection means 10 is provided independently of other parts in the first embodiment, the present invention is not particularly limited to this. It is a matter of course that the same control as described above can be performed if the system control microprocessor 16 is made to include function of the edge detection means 10 so that the system control microprocessor 16 can serve also as the edge detection means 10. Further various modifications can be easily made to the embodiment without departing the gist of the present invention.

A second embodiment of the present invention will be described hereunder.

Figure 7A:
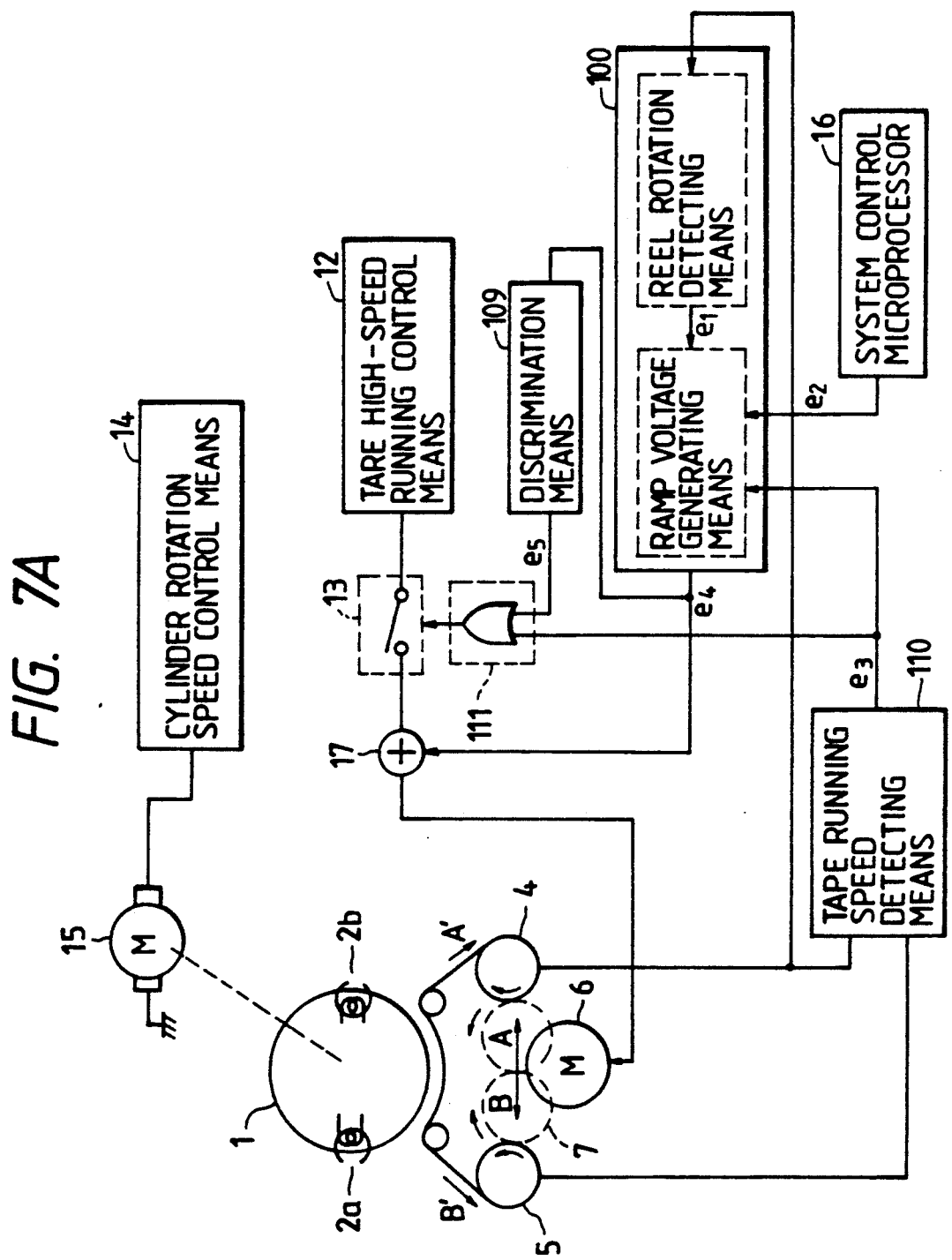
Figure 8A:
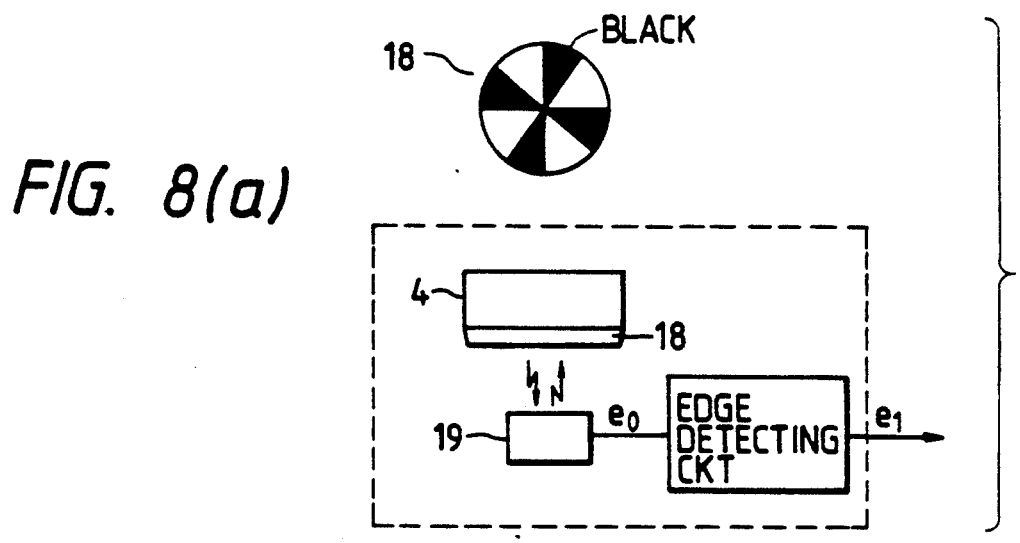
FIGS. 8a-8d are diagrams illustrating the configuration and operation of the reel rotation detection means of the reel motor starting means.
Figure 8B:
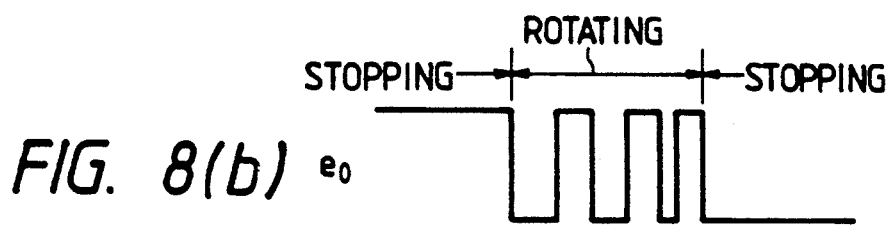
Figure 8C:
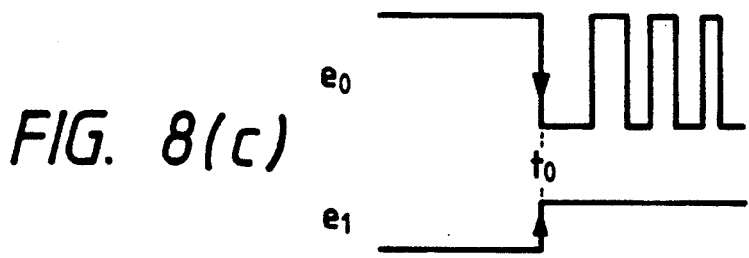
Figure 8D:
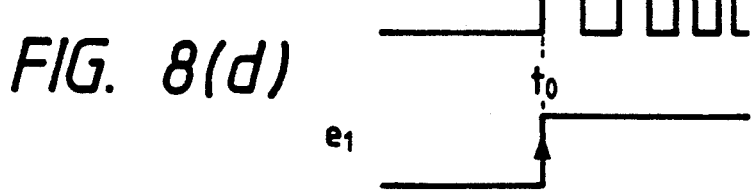

FIG. 7A shows the second embodiment of the present invention which is provided with a reel-motor starting means 100, a discrimination means 109, a tape running speed detection means 110, and a control means 111. The other parts are the same as those in the first embodiment of FIG. 1.

In the embodiment of FIG. 7A, similarly to the first embodiment, a switching means 13 is opened at the start of search so as to open a servo loop, a ramp voltage having a steep gradient is produced from the reel-motor starting means 100 so as to start a reel motor, the movement of reel mount is detected, and then the gradient of the ramp voltage is switched to a gentler gradient so as to gradually and gently raise the running speed of a tape. The fact that the tape running speed has reached a target control value of a high-speed running control means 12 is detected by the tape running speed detecting means 110, and the control means 111 is operated in accordance with the control signal produced by the tape running speed detecting means 110 so as to close the switch means 13 so that the tape is then caused to run at a predetermined speed under the servo control of the tape high-speed running control means 12. Further, even in the case where the tape speed cannot reach the target control value of the high-speed running control means 12 in spite of the fact that the ramp voltage has reached the maximum control value. The fact that the ramp voltage has reached the maximum control value is detected by the discrimination means 109 so that the switching means 13 is forcibly closed by a control signal from the discrimination means to rapidly shift control to the high-speed running control means 12.

Referring to a specific example of configuration or the like of various parts, the operation of the reel motor start control, which is the main feature of the present invention will be described hereunder.

FIG. 8 shows the structure of the reel-mount rotation detection mean included in the reel-motor starting means 100 and the operation waveforms thereof. In FIG. 8(a), aluminum foil, for example, is provided, which is integrally attached to each reel mount and the surface of which is equidistantly black-processed on the circumference of the foil, a photodetector 19, and an edge detection circuit. The operation is similar to that of the rotation detection means in the first embodiment described above.

Figure 9A:
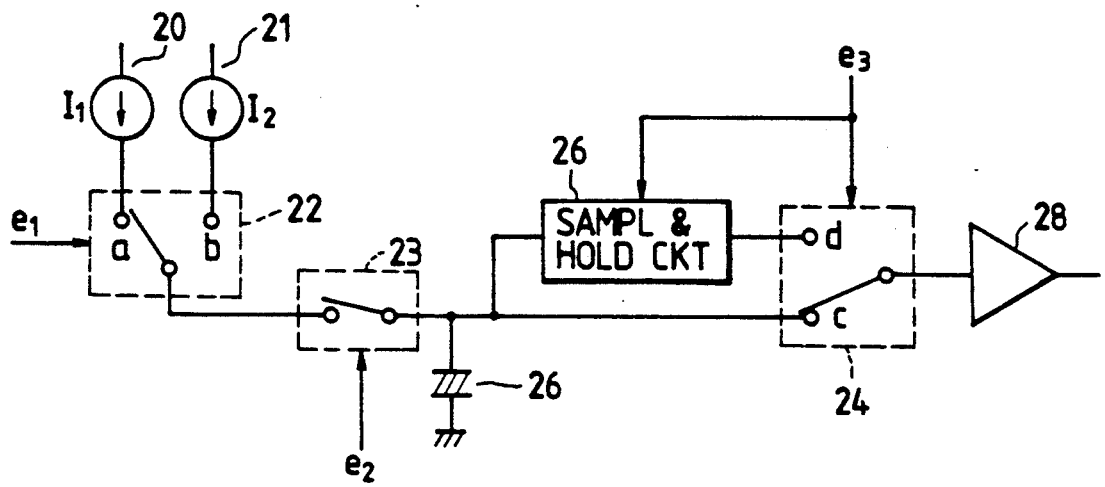
FIGS. 9a and 9b are diagrams illustrating the configuration and operation of the ramp voltage generation circuit of the reel motor starting means.
Figure 9B:
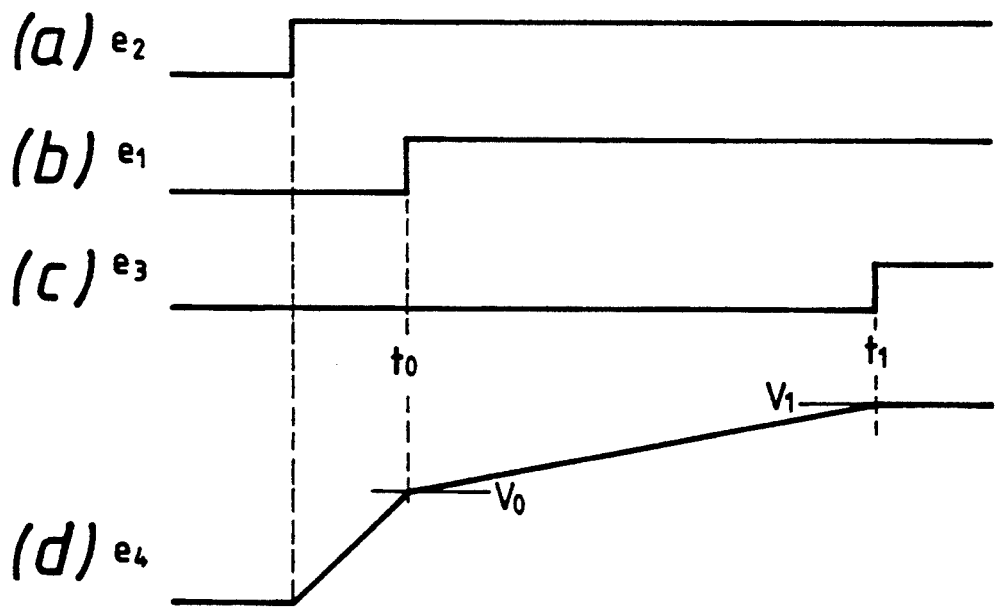

FIGS. 9A and 9B show a specific example of a ramp voltage generation circuit of the reel motor starting means 100 and the operation waveforms thereof. The operation is similar to that of the reel-motor starting means 11 in FIG. 1.

Figure 10A:
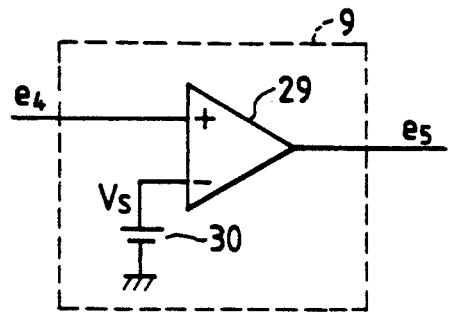
FIG. 10 is a diagram illustrating the configuration and operation of the discrimination means.
Figure 10B:
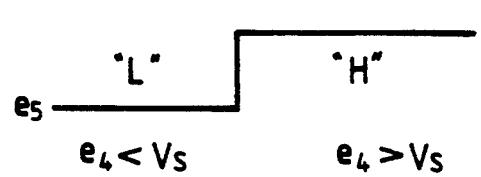

FIG. 10 shows the configuration of the discrimination means 109 and the operation thereof. In the drawing, a voltage comparator 29 and reference voltage 30 are provided. The reference voltage 30 is selected to be a value $V_s$ which is a little smaller than the maximum control value of a ramp voltage $e_4$ produced from the reel-motor starting means 100. In the case where the ramp voltage $e_4$ exceeds a value $V_s$ as shown in the drawing, the discrimination means 9 produces a voltage-comparison control signal $e_5$.

Figure 11A:
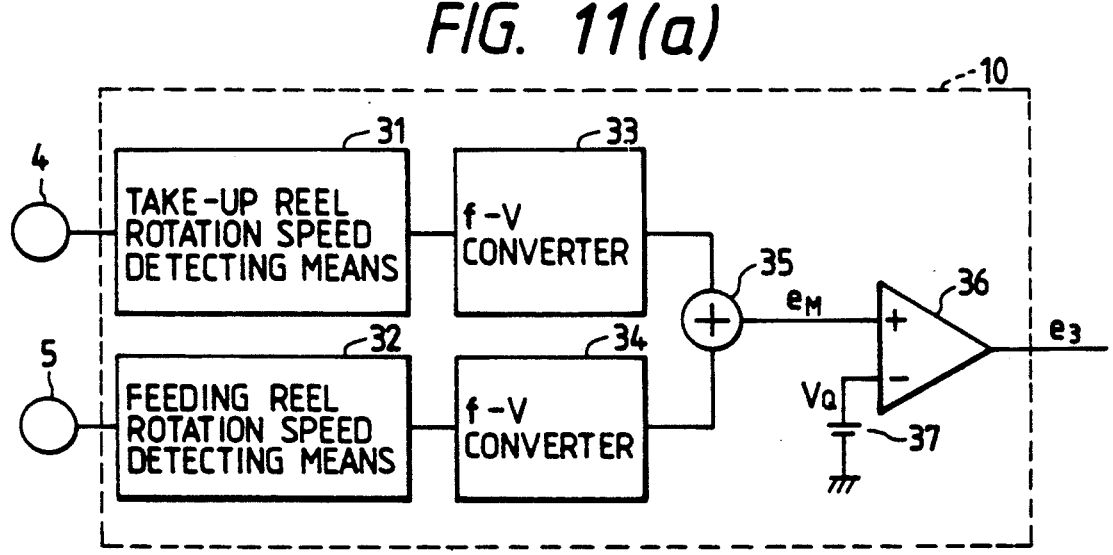
FIG. 11 is a diagram illustrating the configuration and operation of the tape running speed detection means.
Figure 11B:
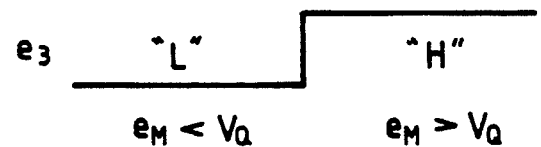

FIG. 11 shows the structure and operation of the tape running speed detection means 110. The tape running speed detection means 110 is provided with a pair of reel-mount rotation speed detection means 31 and 32 disposed on a tape take-up side and on a tape feeding side respectively, f-V converters 33 and 34, an adder 35, a voltage comparator 36, and a reference voltage 37. The other parts are correspondingly referenced to those in FIG. 1. The respective reel-mount rotation speed detection means 31 and 32 are constituted, for example, by light detection means similar to those in FIG. 2, and arranged to produce rotation-speed signals synchronized with the rotation of the tape take-up side reel mount 4 and a tape feed side reel mount 5 respectively. The f-V converters 33 and 34 are arranged to produce voltage in proportion to the frequencies of the reel-mount rotation-speed signals produced from the reel mount rotation speed detection means 31 and 32 respectively. The f-V conversion characteristics of the two converters 33 and 34 are established to be equal.

Now, in the case where a tape is made to run at a desired constant high speed, there is a character that the sum of the respective reel-mount rotation frequencies on the feed and take-up sides is substantially constant over the whole range of the tape in accordance with the running speed. Qualitatively, in the case where the tape running speed is made constant, the diameter of the coiled tape on the take-up side becomes gradually large as the tape is taken up, and the reel-mount rotation speed on the take-up side becomes lower as the coiled-tape diameter becomes larger. On the tape feed side, on the contrary, the coiled-tape diameter becomes small gradually, so that the reel-mount rotation speed becomes higher. This fact has been well known. If the sum of the rotation speeds of the reel mounts is detected, therefore, the running speed of the tape can be known regardless of the position of the tape. This means that if the rotation of the reel mounts is controlled so as to keep the sum of the rotation speeds of the reel mounts to a predetermined value, it is possible to make the tape run at a predetermined constant speed. In the example shown in FIG. 11, utilizing this character, the respective outputs of the f-V converters 33 and 34 are added to each other by the adder 35 so as to generate a signal $e_M$, and the signal $e_M$ is compared with the reference voltage 37, thereby detecting the tape running speed. The value of the reference voltage 37 is set to $V_Q$ which is a little smaller than the value of the signal $e_M$ which corresponds to the predetermined tape running Speed set by the tape high-speed running control means 12 in FIG. 1. Accordingly, the signal $e_M$ becomes larger as the running speed of the tape becomes higher. If the running speed of the tape has reached the target control value of the tape high-speed running control means 12 so as to the satisfy the condition of $e_M > V_Q$, the voltage comparator 36 produces a control signal of "H".

The control means 111 is constituted by an OR gate so as to produce a control output of "H" when one of the control signal $e_3$ of the tape running speed detection means 110 and the control signal $e_5$ of the discrimination means 109 is in the state of "H". Further, the switching means 13 is constituted by an on/off switch and arranged to close the contact when the control output of "H" is produced from the control means 111.

The configuration and operation of each of the parts have been described above. The control operation of the whole system will be described hereunder.

FIG. 12 shows waveforms for explaining the operation. When a search command $e_2$ is produced from the system control microprocessor 16 as shown in the waveform (a) of FIG. 12, a ramp voltage having a steep gradient is produced from the reel-motor starting means 100 as shown in the waveform of FIG. 12 to thereby start the reel motor. When the reel mount starts to move at a point of time $t_0$, the gradient of the ramp voltage $e_4$ is switched to a gentler gradient by the control signal el produced from the reel-mount rotation detection means as shown in the waveform of (c) of FIG. 12. The rotation speed of the reel motor is gradually raised by the gentle ramp voltage after the time to, so that the tape running speed is gently raised in accordance with the rising of the rotation speed of the reel motor as shown by a curve I shown with a solid line in the waveform of (f) of FIG. 12. When the tape running speed has reached the target control value of the tape high-speed running control means 12 at a point of time $t_1$, the control signal $e_3$ is produced from the tape running speed detection means 110 as shown in the waveform of (d) of FIG. 12, so that the ramp voltage $e_4$ is pre-held and the switch 13 of the control means is closed. Accordingly, after the time $t_1$, the tape is controlled so as to run at a predetermined high speed by the servo operation of the tape high-speed running control means 12 around the held value of the ramp voltage.

Further, in the case where a tape take-up load is large, the initiation of rotational of the reel mounts by the ramp voltage having the steep gradient becomes late so that the reel mounts are started to move at a point of time $t_0$, and the gradient of the ramp voltage is switched at this time $t_0$,. Although the rotation of the reel mounts is raised by the gentle ramp voltage after the time $t_0$, the rising of the tape speed is gentler than the curve of I as shown by a broken line curve II in the waveform (e) of FIG. 12, because the tape take-up load is large. In the case where the tape speed cannot reach the target control value of the high-speed running control means 12 before the ramp voltage has reached the maximum control value $V_M$, the control signal $e_3$ is not produced from the tape running speed detection means 110. At the time $t_2$ when the ramp voltage reaches the maximum control value $V_M$, however, the control signal $e_5$ is produced from the discrimination means 109 as shown in the waveform (e) of FIG. 12, so that the switch 13 of the control means is closed. Accordingly, after the time $t_2$, the tape speed is drawn into the predetermined speed by the servo operation of the tape high-speed-running control means 12 around the maximum control value $V_M$ of the ramp voltage, and then the tape speed is controlled to run at a constant speed by the tape high-speed running control means 12.

The second embodiment of the present invention has been thus described above. Although description has been made as to the case where two constant-current regulated power supplies are provided in the ramp voltage generation circuit of FIG. 9 and the connection of the constant-current regulated power supplies is changed over to thereby switch the gradient of the ramp voltage in the second embodiment of the present invention, the present, invention is not particularly limited to this. The invention is applicable to the case where one constant-current regulated power supply is used and a connection of capacitors having different capacitors are switched therebetween. Further, although the system is constituted by analog circuits in the second embodiment, the system may be constituted by digital circuits..Moreover, although the edge detection means is provided independently of other parts in the sample of FIG. 8, the present invention is not particularly limited to this. It is a matter of course that the same control as described above can be performed if the system control microprocessor 16 is made to have the function of the edge detection means so that the system control microprocessor 16 can serve also a the edge detection means, or if the tape running speed detection means shown in FIG. 11 is arranged so that the tape running speed can be directly detected. Further various modifications can be easily made to the second embodiment without departing from the spirit of the present invention.

Furthermore, it is easy to combine the first and the second embodiments as shown in FIG. 7B.

Figure 13:
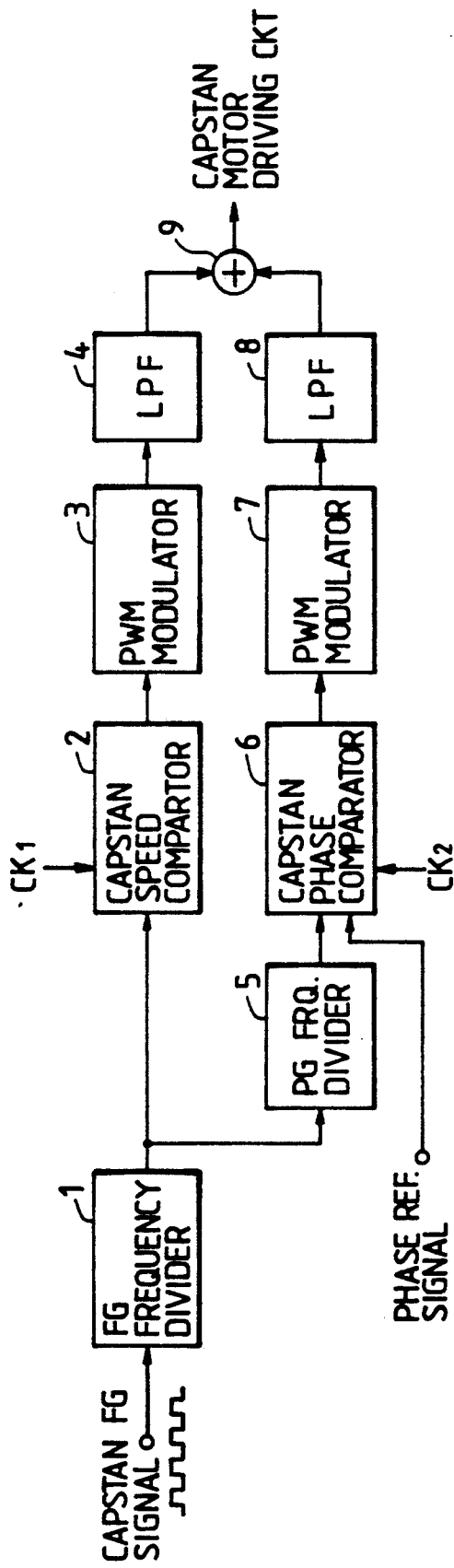
FIG. 13 is a circuit diagram of a conventional capstan servo.
Figure 14:
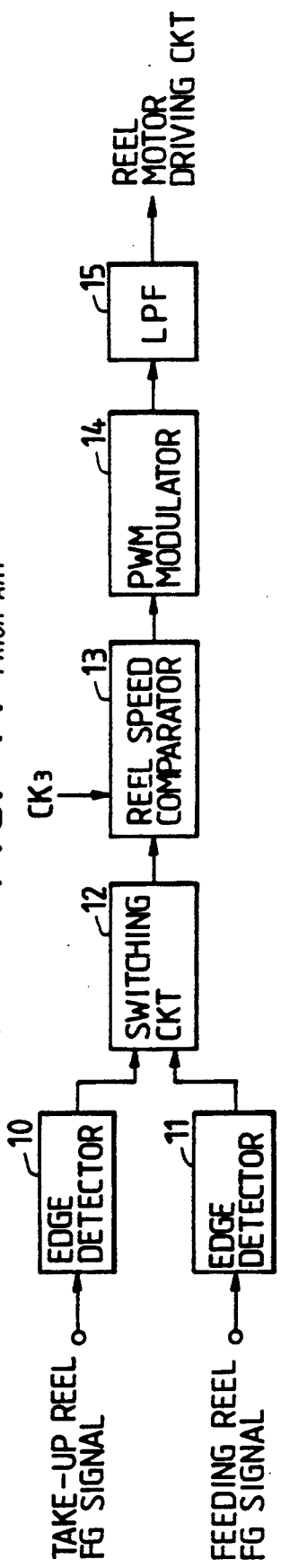
FIG. 14 is a circuit diagram of a conventional reel servo.
Figure 15:
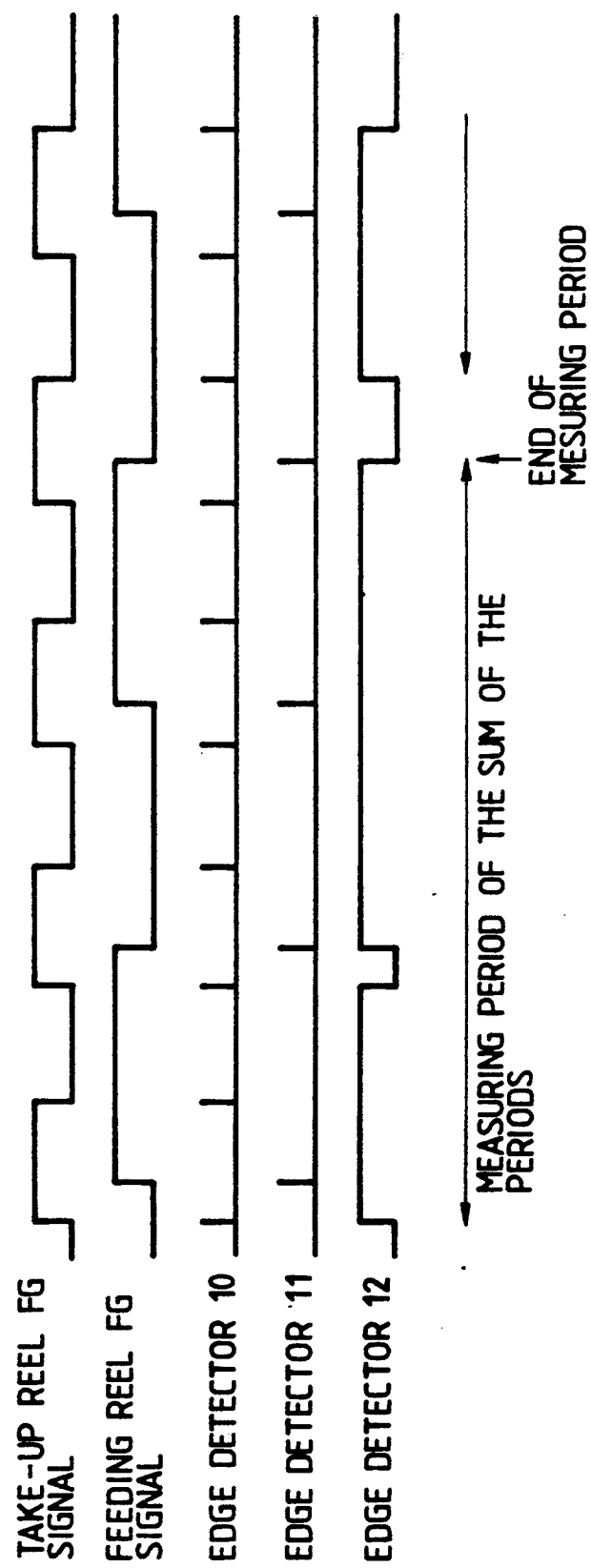
FIG. 15 is a characteristic diagram showing the timing for measuring the sum of periods in the above reel servo.
Figure 16:
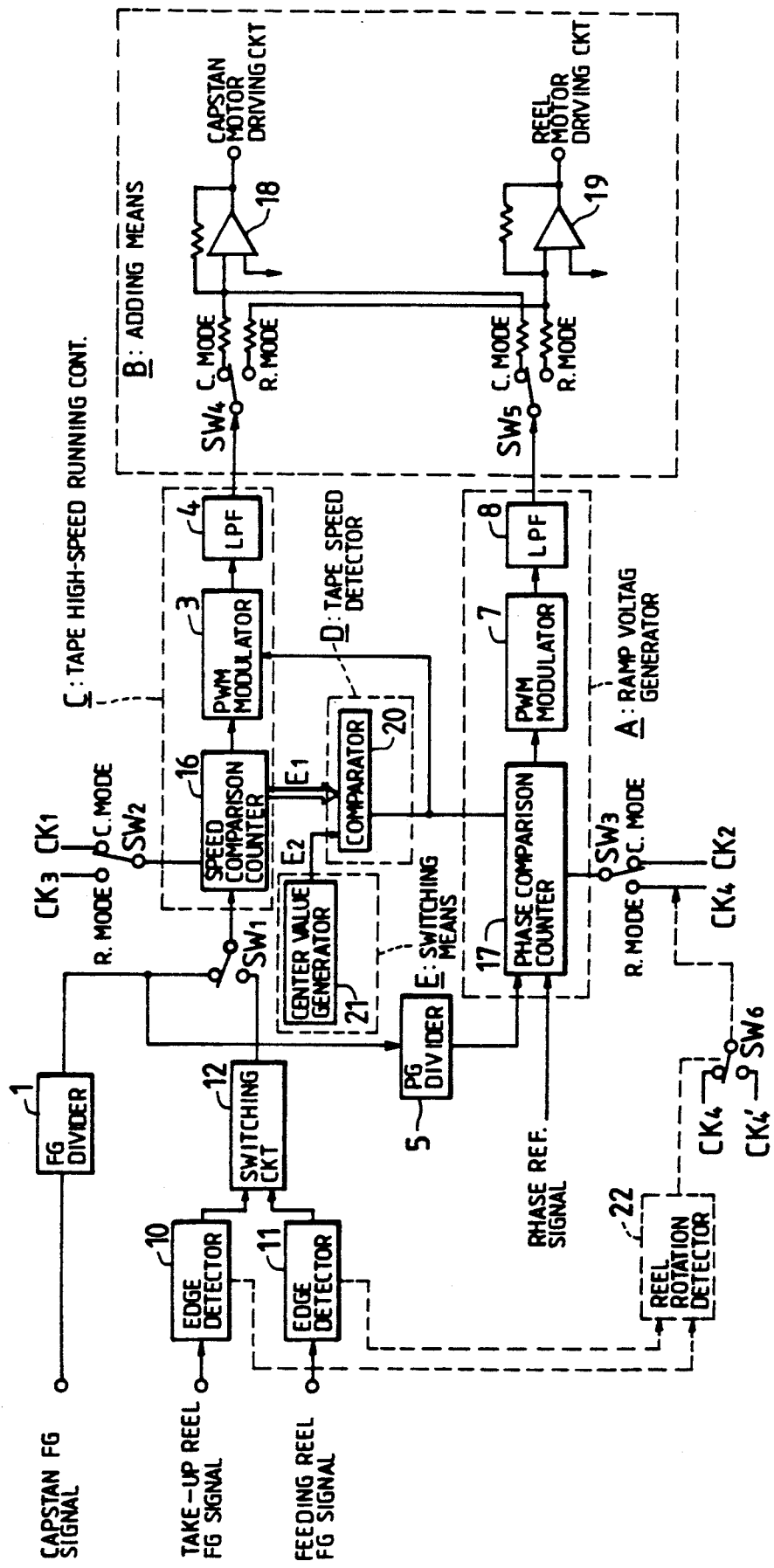
FIG. 16 is a circuit diagram showing an embodiment according to the present invention.

An third embodiment of the present invention will be described hereunder with reference to FIG. 16. In FIG. 16, the reference numerals the same as those used in FIGS. 13 and 14 of the prior art designate the same circuits, and, accordingly, repetition of description will be avoided.

According to the present invention, the control system is used commonly to the reel servo system and the capstan servo control system, on the basis of the fact that the capstan servo system is not used during the high-speed tape running, that is, in a reel servo mode, and the reel servo system is not used in a capstan servo mode.

According to the present invention, a speed comparison counter 16 and a phase-comparison counter 17 are used as control counters. To use the counters commonly to the capstan servo and the reel servo, the clock pulses of the counters 16 and 17 and other control signals are switched by switches $SW_1$ to $SW_3$ in accordance with the mode. The switch $SW_1$ operates to switch a signal the period of which is measured by the speed-comparison counter 16. That is, the switching by the switch $SW_1$ is made so that the period of the capstan FG signal is measured in the capstan mode, while the sum of the respective periods of the take-up reel FG signal and the feed reel FG signal is measured in the reel mode. The switch $SW_2$ operates to switch a clock for the speed-comparison counter 16. That is, the switch $SW_2$ selects the clock signal $CK_1$ in the capstan mode while selects the clock signal $CK_3$ in the reel mode. The switch $SW_3$ operates to switch a clock for the phase-comparison counter 17. That is, the switch $SW_3$ selects the clock signal $CK_2$ in the capstan mode while selects the clock signal $CK_4$ in the reel mode.

The error voltages from the low-pass filters 4 and 8 are added to each other at respective suitable addition rates in the capstan mode and in the reel mode through the mode-changeover switches $SW_4$ and $SW_5$ which change over the mode between the capstan mode and the reel mode. The resultant voltages in the in the capstan mode and in the reel mode are amplified by corresponding operational amplifiers 18 and 19, and the amplified voltages are applied to corresponding motor driver circuits for driving the capstan and the reel respectively.

The reference numeral 20 designates a comparator for comparing, only in the reel mode, the error data $E_1$ from the speed-comparison counter 16 with the error data center value $E_2$ from a center value generator 21 for generating an error date center value. When $E_1 < E_2$, the output signal from the comparator 20 is supplied to both the phase-comparison counter 17 and the pulse-width modulator 3.

In the following, the operation is described on the basis of the aforementioned circuit configuration.

The operation of the phase-comparison counter 17 in the capstan mode will be now described. The switches $SW_4$ and $SW_5$ are changed over to the capstan mode side. In the capstan mode, the operation is carried out in the same manner as in the prior art. In the speed-comparison counter 16, the output of the FG frequency divider 1 applied to the counter 16 through the switch $SW_1$ is counted up on the basis of the clock pulses $CK_1$ given to the counter 16 through the switch $SW_2$. The output signal from the speed-comparison counter 16 is converted into a digital speed error by the pulse-width modulator 3. On the basis of the digital speed error, an analog error voltage is obtained through the low-pass filter 4. On the other hand, the output from the FG frequency divider 1 is applied to the phase-comparison counter 17 through the PG frequency divider 5. In the phase-comparison counter 17, the phase deviation between the output from the PG frequency divider 5 and a phase reference signal is counted up on the basis of the clock pulses $CK_2$. The output signal from the phase-comparison counter 17 is converted into a digital phase error by the pulse-width modulator 7. On the basis of the digital phase error, an analog error voltage is obtained through the low-pass filter 8. The thus obtained analog error voltages are added at a suitable gain rate, and the resultant voltage is supplied to the capstan motor drive circuit through the operational amplifier 18.

Figure 17:
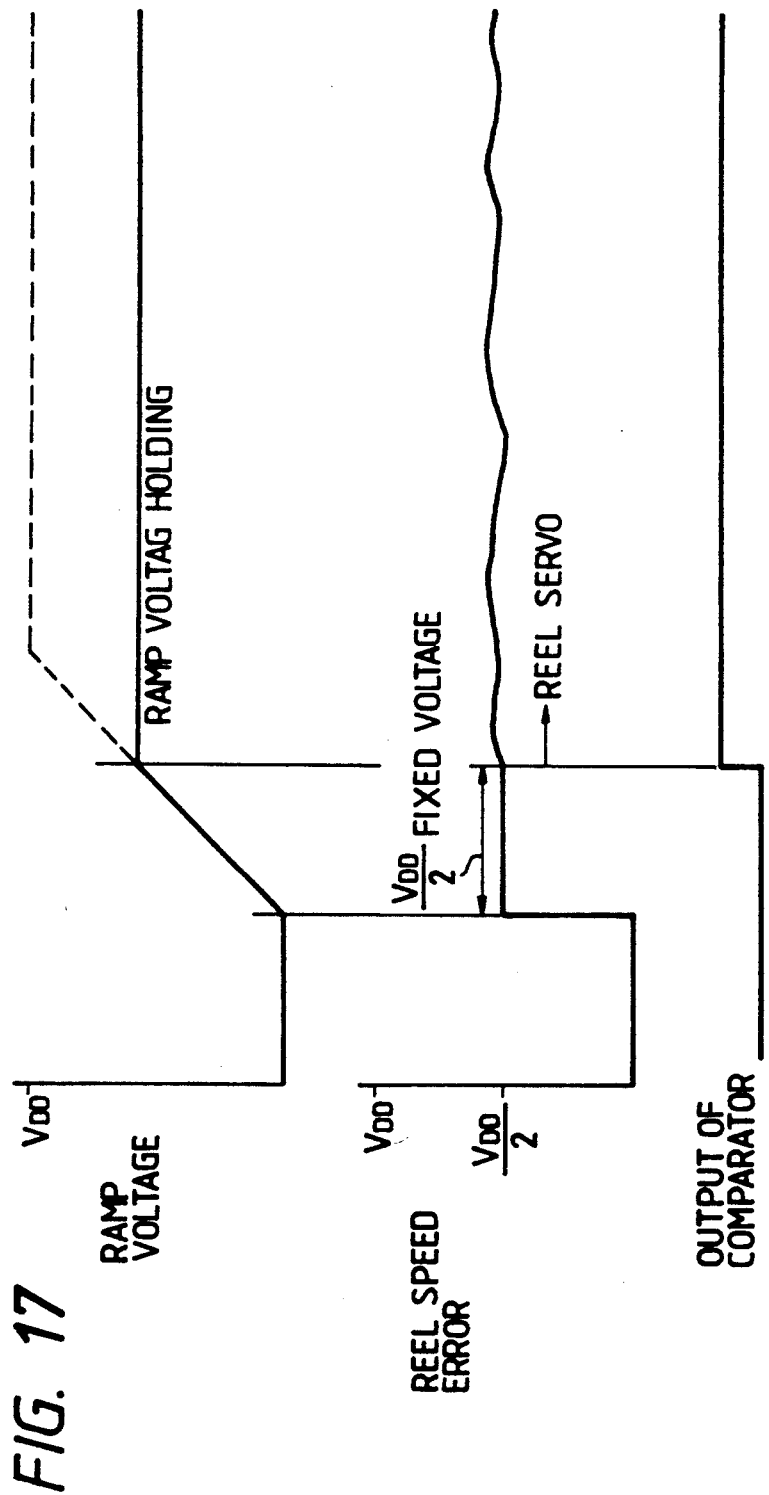
FIG. 17 is a characteristic diagram showing the output voltage in the reel mode.
Figure 18:
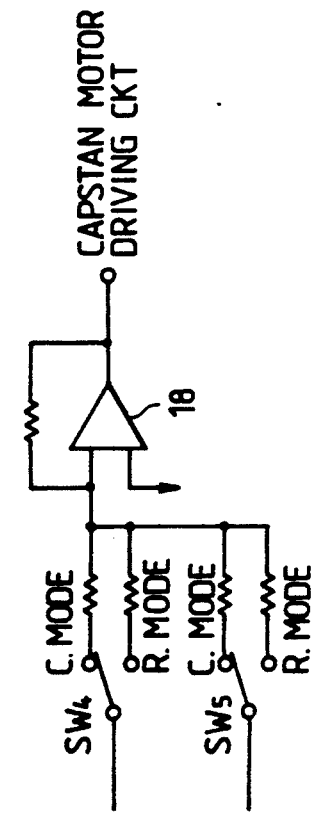
FIG. 18 is a circuit diagram showing a part of another embodiment.

Next, the operation in the reel mode will be described. The switches $SW_4$ and $SW_5$ are changed over to the reel mode side. In starting the rotation of the reel, a ramp voltage for making the rotation speed of the reel rise gently is generated. To this end, in the reel mode, the clock pulses $CK_4$ are supplied to the phase-comparison counter 17 through the switch $SW_3$ so as to cause increment counter 17 to increment. Once cleared the counter 17 acts to count up the clock pulses $CK_4$, upon initiation of the reel mode. The count data is modulated into a pulse signal by the pulse-width modulator 7 and the pulse signal is made to be an analog error voltage through the low-pass filter 8. Accordingly, a ramp voltage can be obtained in the low pass filter 8. The slope of the ramp voltage is determined by the number of bits in the phase-comparison counter 17 and the frequency of the clock pulse signal $CK_4$. Because the comparator 20 operates at this time, the ramp voltage is as follows. When the reel mode is started, the reel is in a stationary state, so that the speed-comparison counter 16 is in an overflow state and the level of the data modulated by the pulse-width modulator 3 ought to be high all the time. The modulated data is however switched to a a duty factor of 50% by an encoder portion in the pulse-width modulator 3 on the basis of the output signal of the comparator 20 so that a voltage of $V_{DD}/2$ as shown in FIG. 17 is generated from the low-pass filter 4, when a source voltage is represented by $V_{DD}$.

The comparator 20 operates to compare error data $E_1$ obtained from the speed-comparison counter 16 in the reel servo time and center value $E_2$ obtained from the center value generator 21. When, for example, the speed-comparison counter 16 is composed of 9 bits, the center value $E_2$ becomes "100,000,000". Accordingly, the output of the comparator 20 is inverted at the point of time when the error data $E_1$ becomes less than the center Value $E_2$ of the speed servo detection range after the rotation of the reel is started in the reel model. By this inversion of the output, thereafter, the speed error data $E_1$ is converted into a digital phase error by the pulse-width modulator 7. Because the center value of $V_{DD}/2$ is given as an initial speed error voltage in the reel mode, the error voltage is output at the point of time when the output of the comparator 20 is inverted by acceleration of the reel rotation. After this point of time, the mode is switched to the servo mode.

On the other hand, acceleration after the setting of the reel mode is carried out by the ramp voltage from the phase-comparison counter 17. At the point of time when the output of the comparator 20 is inverted, the state of the phase-comparison counter 17 is turned to a count-disable state corresponding to the output of the comparator 20 to hold the ramp voltage.

Although the aforementioned embodiment has shown the case where a capstan motor and a reel motor are provided separately, the invention is applicable to the case where a real motor us used also as a capstan motor. In the latter case, the output sides of the change-over switches $SW_4$ and $SW_5$ may be connected commonly to the capstan-side operational amplifier 18 so that the operational amplifier 18 can be used commonly.

In the aforementioned embodiment, the clock pulse signal $CK_4$ for generating the ramp voltage has been explained as a fixed-frequency signal in the reel mode time. However, in the reel driving system according to the present invention, the value of the ramp voltage for starting the rotation cannot be defined practically, in the relation in offset or the like of the motor driver. Accordingly, a waste of time arises between the setting of the reel mode and the starting of the reel rotation. In particular, in the case where the frequency of the clock pulse signal $CK_4$ is reduced to make the slope of the ramp voltage slow, a problem in time lag of the operation arises. Therefore, a reel rotation detector 22 as shown by the broken line in FIG. 16 is provided to judge whether the reel rotation is started or not. After which, the setting of the reel mode is terminated on the basis of the rising and falling edges of the take-up reel FG signal and the feed reel FG signal, which are detected by the edge detectors 10 and 11. Before the reel rotation is detected, a switch $SW_6$ is changed to apply a clock pulse signal $CK_4'$ having a higher frequency than the originally set frequency to the phase-comparison counter 17. After the rotation is started, the clock pulse signal $CK_4$ having the originally set frequency is applied to the counter 17. By the aforementioned modification, the wasteful time can be shortened.

As described above, according to the present invention, the reel motor is driven by the ramp voltage having a steep gradient simultaneously with the initiation of search, and after the reel motor has started to actually rotate so that the reel mounts have been started to actually move, the rotation of the reel mounts is detected so that the ramp voltage applied to the reel motor is changed over from that having a steep gradient to that having a gentle gradient. Further, the detection of the rotation of the reel motor is performed by detecting the movement of the reel mount always on the tape take-up side in accordance with the search direction. Accordingly, it is possible to shorten the loss time before the reel motor begins to actually rotate in starting the reel motor. Further, the rotation of the reel motor, hence the tape running speed, can be gently and gradually raised in accordance with the gradient of the ramp voltage even in the case where the tape has slack. Accordingly, it is possible to prevent the coming out of the lock of the cylinder rotation speed follow-up servo due to the steep rising of the tape running speed, and it is possible to realize stable search control.

Further, according to the present invention, the reel motor is driven by the ramp voltage having a steep gradient at the same time as the initiation of search, the ramp voltage is changed over from that having a steep gradient to that having a gentle gradient after the reel motor has started to actually rotate. The original servo operation of the tape high-speed running control is closed when the tape running speed has reached a predetermined value by the raising the rotation speed of the reel motor. In addition, when the tape speed has not reached the predetermined speed although the ramp voltage has reached the maximum control value, the original servo operation of the tape high-speed running control is closed upon detection of such a state. Accordingly, the coming out of the lock of the cylinder rotation speed follow-up due to the steep rising of the tape running speed at the initiation of the servo can be prevented. The tape running control can be smoothly performed after the tape speed has reached the predetermined speed in accordance with the ramp voltage. Even in the case where the tape speed can not reach the predetermined speed because of a large tape take-up load although the ramp voltage has reached the control maximum, it is possible to prevent the tape from continuing to run at a low speed so as to make it possible to rapidly perform the tape running control to make the tape run at a constant speed.

Furthermore, the present invention has following effects. That is, as described above, according to the present invention, the control circuit can be used commonly for the capstan servo and the reel servo, so that it is unnecessary to provide a part of the respective servo circuits separately. Accordingly, the circuit scale can be reduced, and can be realized as an integrated circuit. Further, the manufacturing cost can be reduced, so that inexpensive products can be provided. Furthermore, at the point of time when the servo center crossing is detected after the start of the reel rotation in the reel servo mode, the ramp voltage is held and the servo is turned on, so that the mode can be changed over into the servo mode smoothly.

What is claimed is:

1. An apparatus, which uses magnetic heads to record a signal onto and reproduces a signal from a magnetic tape, for selecting one of a high speed and a normal speed rotating operation to be preformed, said apparatus controlling rotational speeds of said tape and said magnetic heads based on said selection, said apparatus comprising:

a rotary cylinder with said magnetic heads thereon, cylinder rotation control means for controlling a rotating speed of said rotary cylinder during high speed and normal speed rotating operations, said cylinder rotation control means increasing the cylinder rotating speed between the normal and high speed rotating operations, a tape driving mechanism for maintaining a constant relation between said rotating speed of said rotary cylinder and a linear speed of said tape across said rotary cylinder, said tape driving mechanism comprising:

reel mounts for taking-up and feed-out said tape, said tape being mounted on said reel mounts;

a real motor, which rotates said reel mounts, thereby driving said tape, reel motor starting means for generating an increasing ramp voltage to initiate and gradually increase a rotating speed of said reel motor, when said driving mechanism indicates said tape is to be driven at a high speed, high speed control means for generating an output voltage in response to a command from said tape driving mechanism, wherein said output voltage is sufficient to drive said reel motor at a rotating speed higher than a normal recording/reproducing rotating speed, switching means for turning said output voltage of said high speed control means on and off, adding means for combining said increasing ramp voltage and said output signal of said high speed control means, which is turned on and off by said switching means, to generate an output voltage which drives said reel motor, thereby maintaining said constant relation between said rotary cylinder rotating speed and said tape linear speed by gradually increasing said tape linear speed at a rate equal to a rate, at which the cylinder rotating speed is increased between normal and high speed rotating operations.

2. The apparatus as claimed in claim 1, further comprising: detection means for measuring rotation from one of said reel mounts, wherein said detection means include reel mount detection means for sensing rotation of a take-up reel mount and a feed-out reel mount, and edge detecting means for detecting an edge of an output signal of said reel mount detection means.

3. The apparatus as claimed in claim 2, wherein said reel motor starting means generate a first increasing ramp voltage when said tape driving mechanism indicates that said tape is to be driven at a high speed in said high speed rotating operation and a second increasing ramp voltage when said detection means senses motion at the take-up reel mount.

4. The apparatus as claimed in claim 1, further comprising:

discrimination means for monitoring said increasing ramp voltage and generating a control signal when said increasing ramp voltage reaches a predetermined level;

tape speed detecting means for measuring a running speed of said magnetic tape and generating a control signal when the tape running speed reaches a predetermined speed; and control means for controlling said switching means in response to at least one of the control signals generated by said discrimination means and said tape speed detecting means.

5. The apparatus as claimed in claim 4, wherein said tape speed detecting means detects the tape speed based upon a rotating speed of said reel mounts.

6. The apparatus as claimed in claim 4, wherein said tape speed detecting means include frequency to voltage converting means.

7. The apparatus as claimed in claim 4, wherein said control means is a OR gate.

8. The apparatus as claimed in claim 4, wherein said discrimination means generates the control signal when said tape speed does not reach the predetermined speed even if the increasing ramp voltage has reached the predetermined level, so as to switch said switching means to turn on the output signal of said high speed control means.

9. The apparatus as claimed in claim 1, further comprising:

detection means for measuring rotating of one of said reel mounts, said reel motor starting means generating a first increasing ramp voltage, in response to said tape driving mechanism, and a second increasing ramp voltage after said detection means senses motion from one of said reel mounts, wherein said first increasing ramp voltage has a steeper gradient than said second increasing ramp voltage.

* * * * *